US008741485B2

(12) United States Patent
Lopez et al.

(10) Patent No.: US 8,741,485 B2
(45) Date of Patent: Jun. 3, 2014

(54) LAYER-LAYER LITHIUM RICH COMPLEX METAL OXIDES WITH HIGH SPECIFIC CAPACITY AND EXCELLENT CYCLING

(71) Applicant: Envia Systems, Inc, Newark, CA (US)

(72) Inventors: Herman A. Lopez, Sunnyvale, CA (US); Subramanian Venkatachalam, Pleasanton, CA (US); Deepak Kumaar Kandasamy Karthikeyan, Newark, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 0 days.

(21) Appl. No.: 13/765,359

(22) Filed: Feb. 12, 2013

(65) Prior Publication Data

US 2013/0216900 A1      Aug. 22, 2013

Related U.S. Application Data

(63) Continuation of application No. 12/869,976, filed on Aug. 27, 2010, now Pat. No. 8,394,534.

(60) Provisional application No. 61/237,344, filed on Aug. 27, 2009.

(51) Int. Cl.
*H01M 4/13* (2010.01)

(52) U.S. Cl.
USPC .... 429/231.95; 429/223; 429/224; 429/231.3

(58) Field of Classification Search
CPC .......... H01M 2004/028; H01M 4/131; H01M 4/505; H01M 4/62; H01M 10/44; H01M 10/486
USPC .......................... 429/231.95, 223, 224, 231.3
See application file for complete search history.

(56) References Cited

U.S. PATENT DOCUMENTS

| | | | |
|---|---|---|---|
| 5,658,693 | A | 8/1997 | Thackeray et al. |
| 5,674,645 | A | 10/1997 | Amatucci et al. |
| 6,037,095 | A | 3/2000 | Miyasaka |
| 6,087,042 | A | 7/2000 | Sugiyama et al. |
| 6,168,887 | B1 | 1/2001 | Dahn et al. |
| 6,183,718 | B1 | 2/2001 | Barker et al. |
| 6,248,477 | B1 | 6/2001 | Howard, Jr. et al. |

(Continued)

FOREIGN PATENT DOCUMENTS

| | | |
|---|---|---|
| CN | 1389941 A | 1/2003 |
| CN | 101174684 A | 5/2008 |

(Continued)

OTHER PUBLICATIONS

Office Action for corresponding Taiwan Patent Application No. 099128959, mailed Mar. 21, 2013.

(Continued)

*Primary Examiner* — Jane Rhee
(74) *Attorney, Agent, or Firm* — Dardi & Herbert, PLLC; Peter S. Dardi

(57) ABSTRACT

Lithium rich and manganese rich lithium metal oxides are described that provide for excellent performance in lithium-based batteries. The specific compositions can be engineered within a specified range of compositions to provide desired performance characteristics. Selected compositions can provide high values of specific capacity with a reasonably high average voltage. Compositions of particular interest can be represented by the formula, $x\ Li_2MnO_3 \cdot (1-x)\ Li\ Ni_{u+\Delta}Mn_{u-\Delta}Co_wA_yO_2$. The compositions undergo significant first cycle irreversible changes, but the compositions cycle stably after the first cycle.

24 Claims, 27 Drawing Sheets

(56) References Cited

U.S. PATENT DOCUMENTS

| | | |
|---|---|---|
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,749,648 B1 | 6/2004 | Kumar et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,072 B2 | 4/2007 | Kang et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0114995 A1 | 8/2002 | Thackeray et al. |
| 2002/0192148 A1 | 12/2002 | Kweon et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2005/0031942 A1 | 2/2005 | Hennige et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0281212 A1 | 12/2007 | Thackeray et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0075165 A1 | 3/2009 | Park et al. |
| 2009/0087362 A1 | 4/2009 | Sun et al. |
| 2009/0127520 A1 | 5/2009 | Whitfield et al. |
| 2009/0155694 A1 | 6/2009 | Park |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0104944 A1 | 4/2010 | Saito et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |

FOREIGN PATENT DOCUMENTS

| | | |
|---|---|---|
| EP | 2264814 A1 | 12/2010 |
| JP | 57065674 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 3276451 | 2/2002 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 A | 8/2007 |
| JP | 2008-091041 | 4/2008 |
| JP | 2008-536285 | 9/2008 |
| JP | 2008-258160 A | 10/2008 |
| JP | 2008-300180 | 12/2008 |
| JP | 2009-076446 A | 4/2009 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 B1 | 1/2008 |
| KR | 10-0822013 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2004/107480 | 12/2004 |
| WO | 2005/119820 | 12/2005 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Armstrong et al., "Demonstrating Oxygen Loss and Associated Structural Reorganization in the Lithium Battery Cathode Li[NiLiMn]O," J. Am. Chem. Soc., 128(26): 8694-8698 (2006).

Aurbach et al. "Studies of cycling behavior, ageing, and interfacial reactions of $LiNi_{0.5}Mn_{1.5}O_4$ and carbon electrodes for lithium-ion 5-V cells," Journal of Power Sources 162:780-789 (2006).

Aurbach et al., "On the capacity fading of $LiCoO_2$ intercalation electrodes: the effect of cycling, storage, temperature, and surface film forming additives," Electrochimica Acta 47:4291-4306 (2002).

Boulineau et al, "Reinvestigation of $Li_2MnO_3$ Structure: Electron Diffraction and High Resolution TEM," Chem. Mater., 21:4216-4222 (2009).

Chen et al., "Studies of $LiCoO_2$ Coated with Metal Oxides," Electrochemical and Solid State Letters, 6(11):A221-A224 (2003).

Chen et al., "Effect of a $ZrO_2$ Coating on the Structure and Electrochemistry of $Li_xCoO_2$ When Cycled to 4.5 V, " Electrochemical and Solid-State Letters, 5(10):A213-A216 (2002).

Cho et al., "Comparison of $Al_2O_3$- and $AlPO_4$-coated $LiCoO_2$ cathode materials for a Li-ion cell," Journal of Power Sources 146:58-64 (2005).

Cho et al., "$LiCoO_2$ Cathode Material That Does Not Show a Phase Transition from Hexagonal to Monoclinic Phase," Journal of the Electrochemical Society, 148(10):A1110-A1115 (2001).

(56) References Cited

OTHER PUBLICATIONS

Cho et al., "High-Performance ZrO2-Coated LiNiO2 Cathode Material," Electrochemical and Solid-State Letters, 4(10):A159-A161 (2001).
Cho et al., "Zero-Strain Intercalation Cathode for Rechargeable Li-Ion Cell," Angew. Chem. Int. Ed., 40(18): 3367-3369 (2001).
Cho et al., "Novel LiCoO2 Cathode Material with Al2O3 Coating for a Li Ion Cell," Chem. Mater., 12(12):3788-3791 (2000).
Choi et al., "Superior Capacity Retention Spinel Oxyfluoride Cathodes for Lithium-Ion Batteries," Electrochemical and Solid-State Letters, 9(5):A245-A248 (2006).
Fey et al., "Enhanced cyclability of LiCoO2 cathodes coated with alumina drived from carboxylate-alumoxanes," Journal of Applied Electrochemistry, 35:177-184 (2005).
Fey et al., "Preformed boehmite nanoparticles as coating materials for long-cycling LiCoO2," Journal of Applied Electrochemistry 34:715-722 (2004).
Fey et al., "A simple mechano-thermal coating process for improved lithium battery cathode materials," Journal of Power Sources 132:172-180 (2004).
Fey et al., "Saturated linear dicarboxylic acids as chelating agents for the sol-gel synthesis of LiNi0.8Co0.2O2," Materials Chemistry and Physics 87:246-255 (2004).
Ho et al., "Application of A-C Techniques to the Study of Lithium Diffusion in Tungsten Trioxide Thin Films," J. Electrochem. Soc., 127(2):343-350 (1980).
Hong et al., "Structural evolution of layered Li1.2Ni0.2Mn0.6O2 upon electrochemical cycling in a Li rechargeable battery," J. Mater. Chem., 20:10179-10186 (2010).
Hwang et al. "Influence of Mn content on the morphology and electrochemical performance of LiNi1-x-yCoxMnyO2 cathode materials," J. Mater. Chem., 13:1962-1968 (2003).
Ito et al., "The relationship between crystal structure and the electrochemical reaction of Li-rich insertion materials (2)" 2010.
Ito et al., "Cyclic deterioration and it's improvement for Li-rich layered cathode material Li[Ni0.17Li0.2Co0.07Mn0.56]O2," Journal of Power Sources, 195:567-573 (2010).
Ito et al., "A new approach to improve the high-voltage cyclic performance of Li-rich layered cathode material by electrochemical pretreatment," Journal of Power Sources 183:344-346 (2008).
Johnson et al., "Lithium-manganese oxide electrodes with layered-spinel composite structures xLi2MnO3 • (1-x)Li1+yMn2-yO4 (0<x<1, 0≤y≤0.33) for lithium batteries," Electrochemistry Communications, 7:528-536 (2005).
Johnson et al. "The significance of the Li2MnO3 component in 'composite' xLi2MnO3 • (1-x)LiMn0.5Ni0.5O2 electrodes," Electrochemistry Communications, 6:1085-1091 (2004).
Kang et al., "Enchancing the rate capability of high capacity xLi2MnO3 • (1-x)LiMO2 (M=Mn, Ni, Co) electrodes by Li-Ni-PO4 treatment," Electrochemistry Communications, 11:748-751 (2009).
Kang et al., "The Effects of Acid Treatment on the Electrochemical Properties of 0.5 Li2MnO3-0.5 LiNi0.44Co0.25Mn0.31O2 Electrodes in Lithium Cells," Journal of the Electrochemical Society 153(6):A1186-A1192 (2006).
Kang et al., "Layered Li(Li0.2Ni0.15+0.5zCo0.10Mn0.55-0.5z)O2-zFz cathode materials for Li-ion secondary batteries," Journal of Power Sources 146:654-657 (2005).
Kim et al., "Remarkable improvement in cell safety for Li[Ni0.5Co0.2Mn0.3]O2 coated with LiFePO4," Journal of Alloys and Compounds 492:L87-L90 (2010).
Kim et al., "Synthesis of spherical Li[Ni(1I3-z)Co(1/3-z)Mn(1/3-z)Mgz]O2 as positive electrode material for lithium ion battery," Electrochimica Acta 51:2447-2453 (2006).
Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152(9):A1707-A1713 (2005).
Kim et al., "Electrochemical and Structural Properties of xLi2M'O3-(1-x)LiMn0.5Ni0.5O2 Electrodes for Lithium Batteries (M' = Ti, Mn, Zr; 0 ≤ x ≤ 0.3)" Chem. Mater., 16:1996-2006 (2004).
Kim et al., "Electrochemical Stability of Thin-Film LiCoO2 Cathodes by Aluminum-Oxide Coating," Chem. Mater., 15 (7):1505-1511 (2003).
Lee et al., "High capacity Li[Li0.2Ni0.2Mn0.6]O2 cathode materials via a carbonate co-precipitation method," Journal of Power Sources, 162:1346-1350 (2006).
Lee et al., "Electrochemical characteristics of Al2O3-coated lithium manganese spinel as a cathode material for a lithium secondary battery," Journal of Power Sources, 126:150-155 (2004).
Luo et al., "On the incorporation of fluorine into the manganese spinel cathode lattice," Solid State Ionics, 180:703-707 (2009).
Myung et al., "Effect of AlF3 Coating on Thermal Behavior of Chemically Delithiated Li0.35[Ni1/3Co1/3Mn1/3]O2," J Phys. Chem. C, 114(10):4710-4718 (2010).
Okumura et al., "Cathode having high rate performance for a secondary Li-ion cell surface-modified by aluminum oxide nanoparticles," Journal of Power Sources 189:471-475 (2009).
Ohsawa et al., "The relationship between crystal structure and the electrochemical reaction of Li-rich insertion materials (1)," 2010.
Park et al., "Physical and electrochemical properties of spherical Li1+x(Ni1/3Co1/3Mn1/3)1-xO2 cathode materials", Journal of Power Sources, 177:177-183 (2008).
Park et al., "Lithium-manganese-nickel-oxide electrodes with integrated layered-spinel structures for lithium batteries," Electrochemistry Communications, 9:262-268 (2007).
Quantachrome Corporation, Brochure for Quantachrome Instruments AUTOTAP device (2007).
Robertson et al., "Mechanism of Electrochemical Activity in Li2MnO3," Chem. Mater., 15:1984-1992 (2003).
Shin et al., "Improvement of electrochemical properties of Li[Ni0.4Co0.2Mn(0.4-x)]O2-yFy cathode materials at high voltage region," Electrochimica Acta 52:1477-1482 (2006).
Song et al., "Two- and three-electrode impedance spectroscopy of lithium-ion batteries," Journal of Power Sources, 111:255-267 (2002).
Sun et al., "AlF3-Coating to Improve High Voltage Cycling Performance of Li[Ni1/3Co1/3Mn1/3]O2 Cathode Materials for Lithium Secondary Batteries," Journal of the Electrochemical Society, 154(3):A168-A172 (2007).
Sun et al., "The preparation and electrochemical performance of solid solutions LiCoO2-Li2MnO3 as cathode materials for lithium ion batteries," Journal of Power Sources, 159:1353-1359 (2006).
Sun et al., "Significant improvement of high voltage cycling behavior AlF3-coated LiCoO2 cathode," Electrochemistry Communications, 8:821-826 (2006).
Thackeray et al., "Li2MnO3-stabilized LiMO2 (M = Mn, Ni, Co) electrodes for lithium-ion batteries," J. Mater. Chem., 2007; 17:3112-3125.
Thackeray et al., "Comments on the structural complexity of lithium-rich Li1+xM1-xO2 electrodes (M=Mn,Ni,Co) for lithium batteries," Electrochemistry Communications, 8:1531-1538 (2006).
Thackeray et al., "Advances in manganese-oxide 'composite' electrodes for lithium-ion batteries," J. Mater. Chem., 15:2257-2267 (2005).
Woo et al., "Significant Improvement of Electrochemical Performance of AlF3-Coated Li[Ni0.8Co0.1Mn0.1]O2 Cathode Materials," Journal of the Electrochemical Society, 154(11):A1005-A1009 (2007).
Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9(5):A221-A224 (2006).
Yabuuchi et al., "Detailed Studies of a High-Capacity Electrode Material for Rechargeable Batteries, Li2MnO3-LiCo1/3Ni1/3Mn1/3O2," J. Am. Chem. Soc., 133:4404-4419 (2011).
Yabuuchi et al., "Study of Li2MnO3-Li(Co1/3Ni1/3Mn1/3)O2 for High Capacity Positive Electrode Material: II. Redox Reaction at the Positive Electrode/Electrolyte Interface," 2010.
Yoshii et al., "Study of Li2MnO3-Li(Co1/3Ni1/3Mn1/3)O2 for High Capacity Positive Electrode Material: I. Change in the Crystal and Electronic Structure upon Li de-intercalation," 2010.

(56) References Cited

OTHER PUBLICATIONS

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155(10):A775-A782 (2008).

International Search Report and Written Opinion for Application No. PCT/US2010/046951, dated Jun. 3, 2011.

Search Report for co-pending European application No. 10815889.0 dated Jan. 2, 2014 (9 pages).

Office Action for co-pending Japanese application No. 2012-527020 dated Jan. 27, 2014 (9 pages).

Jiang et al., "Structure, Electrochemical Properties, and Thermal Stability Studies of Cathode Materials in the xLi [Mn1/2Ni1/2]O2yLiCoO2-zLi[Li1/3Mn2/3]O2 Pseudoternary System (x+y+z=1)," Journal of the Electrochemical Society, 152(9):A1879-A1889 (2005).

Shin et al, "Synthesis and electrochemical properties of Li[Li(1-2x)/3NixMn(2-x)/3]O2 as cathode materials for lithium secondary batteries," Journal of Power Sources, 112:634-638 (2002).

LAYER-LAYER LITHIUM RICH COMPLEX METAL OXIDES WITH HIGH SPECIFIC CAPACITY AND EXCELLENT CYCLING

CROSS REFERENCE TO RELATED APPLICATIONS

This application claims priority to co-pending U.S. patent application Ser. No. 12/869,976 filed on Aug. 27, 2010 to Lopez et al., entitled "Layer-Layer Lithium Rich Complex Metal Oxides with High Specific Capacity and Excellent Cycling," incorporated herein by reference, which claims priority to provisional U.S. patent application Ser. No. 61/237,344 filed on Aug. 27, 2009 to Venkalachalam et al., entitled "Cathode Compositions for Lithium Ion Batteries," incorporated herein by reference.

FIELD OF THE INVENTION

The invention relates to desirable composition ranges of complex metal oxides that provide desirable performance properties.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries can be classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a positive electrode active composition for a lithium ion battery comprising a layer-layer lithium metal oxide approximately represented by the formula x $Li_2MnO_3 \cdot (1-x) Li Ni_{u+\Delta}Mn_{u-\Delta}Co_wA_yO_2$, x is at least about 0.03 and no more than about 0.47, the absolute value of $\Delta$ generally is no more than about 0.2, $2u+w+y$ is approximately equal to 1, w is in the range from 0 to 1, u is in the range from 0 to 0.5 and y is no more than about 0.1 with the proviso that both $(u+\Delta)$ and w are not zero, wherein an optional fluorine dopant can replace no more than about 10 mole percent of the oxygen.

In a further aspect, the invention pertains to a method for synthesizing a positive electrode active composition, the method comprising co-precipitating a precursor composition, adding a lithium source at a selected point in the process, and heating the precursor composition to decompose the precursor composition to form a metal oxide.

The precursor composition can comprise manganese as well as nickel and/or cobalt in selected amounts corresponding to a product composition approximately represented by the formula x $Li_2MnO_3 \cdot (1-x) Li Ni_{u+\Delta}Mn_{u-\Delta}Co_wA_yO_2$, x is at least about 0.03 and no more than about 0.47, the absolute value of $\Delta$ generally is no more than about 0.2, $2u+w+y$ is approximately equal to 1, w is in the range form 0 to 1, u is in the range from 0 to 0.5 and y is no more than about 0.1, with the proviso that both $(u+\Delta)$ and w are not 0, wherein an optional fluorine dopant can replace no more than about 10 mole percent of the oxygen.

In other embodiments, the invention pertains to a positive electrode active material for a lithium ion cell comprising a layered lithium metal oxide approximately represented by the formula $Li_{1+b}Ni_\alpha Mn_\beta Co_\gamma A_\delta O_{2-z}F_z$, where b ranges from about 0.04 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15 and z ranges from 0 to 0.2, with the proviso that both $\alpha$ and $\gamma$ are not 0, and where A is Mg, Sr, Ba, Cd, Zn, Al, Ga, B, Zr, Ti, Ca, Ce, Y, Nb, Cr, Fe, V, Li or combinations thereof, and having a discharge capacity at the 10th cycle that is at least about 180 mAh/g when discharged at room temperature at a discharge rate of 2 C.

In additional embodiments, the invention pertains to a lithium ion battery comprising a negative electrode comprising a graphitic carbon active material, a positive electrode, a separator between the positive electrode and the negative electrode and an electrolyte comprising lithium ions. In some embodiments, the positive electrode active material exhibits a specific discharge capacity of at least about 200 mAh/g discharged from 4.5 volts to 2.0 volts at a C/3 rate at room temperature. The battery can have an average voltage of at least about 3.4 and a pulse DC electrical resistance of no more than about 6 mΩ at a state of charge of at least about 30%.

DETAILED DESCRIPTION OF THE INVENTION

Figure 1:
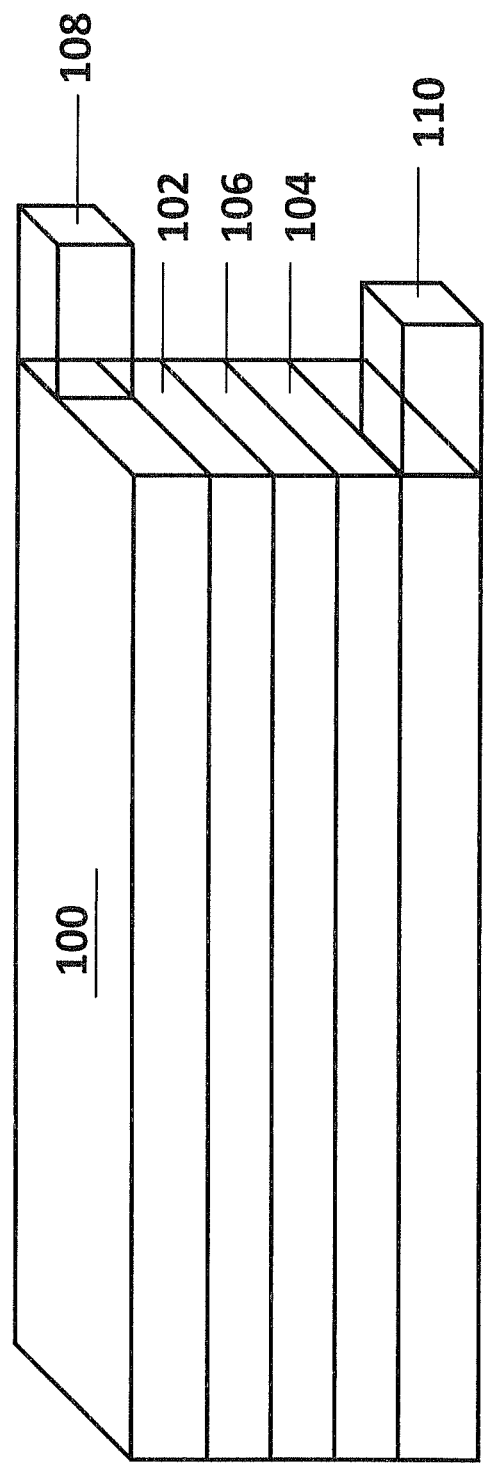
FIG. 1 is a schematic drawing of a battery structure separated from a container.

Specific ranges of metal oxide compositions have been identified that provide an improved balance between particular performance properties, such as a high specific capacity, performance at higher rates, desired values of DC-resistance, average voltage and cycling properties when incorporated into a lithium based battery. In general, the batteries are formed with a composition that can be approximately represented by $Li_{1+b}Ni_\alpha Mn_\beta Co_\gamma A_\delta O_{2-z}F_z$, where A is an optional metal dopant and F is an optional fluorine dopant. In some embodiments, the parameters of the composition stoichiometry are consistent with a composition that can be written as x Li$_2$MnO$_3$·(1−x) LiMO$_2$, where M is mixture of metals generally comprising Mn as well as Ni and/or Co, optionally with a dopant metal, and where 0<x<1. In appropriate embodiments, the two crystalline materials are believed to be integrated within a layer-layer superlattice structure. Ranges of compositions within the genus represented by the formula above have been identified that provide for a large specific discharge capacity, good high rate performance, low DC-resistance and good cycling. Based on this compositional engineering, positive electrode active materials can be designed with excellent performance for selected applications. Coatings can further improve the performance of these positive electrode active compositions.

The positive electrode materials described herein can be used to construct batteries that have a combination of excellent cycling performance, high specific capacity, high overall capacity, relatively high average voltage, low DC-resistance down to relatively low states of charge and excellent rate capability. The resulting lithium ion batteries can be used as an improved power source, particularly for high energy applications, such as electric vehicles, plug in hybrid electric vehicles and the like. The positive electrode materials exhibit a relatively high average voltage over a discharge cycle so that the batteries can have high power output along with a high specific capacity. The density of the compositions generally depends on the composition. The tap density generally depends on the real density and the procedure to form the material. The synthesis approaches described here have been shown to be suitable to form materials with a high tap density. As a result of a relatively high tap density and excellent cycling performance, a battery can exhibit continuing high total capacity when cycled. Furthermore, the positive electrode materials can demonstrate a reduced proportion of irreversible capacity loss after the first charge and discharge of the battery so that the cycling specific capacity can be somewhat greater. The active materials can have an appropriate coating to provide for an improvement in cycling as well as potentially a reduction in irreversible capacity loss and an increase in specific capacity.

The batteries described herein are lithium-based batteries in which a non-aqueous electrolyte solution comprises lithium ions. For secondary lithium ion batteries during charge, oxidation takes place at the cathode (positive electrode) where lithium ions are extracted and electrons are released. During discharge, reduction takes place in the cathode where lithium ions are inserted and electrons are consumed. Unless indicated otherwise, performance values referenced herein are at room temperature.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity loss generally can be attributed to changes during the initial charge-discharge cycle of the battery materials that may be substantially maintained during subsequent cycling of the battery.

The word "element" is used herein in its conventional way as referring to a member of the periodic table in which the element has the appropriate oxidation state if the element is in a composition and in which the element is in its elemental form, M°, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The lithium ion batteries can use a positive electrode active material that is lithium rich relative to a reference homogenous electroactive lithium metal oxide composition. In some embodiments, it is believed that appropriately formed lithium-rich lithium metal oxides have a composite crystal structure. For example, in some embodiments of lithium rich materials, a Li$_2$MO$_3$ material may be structurally integrated with either a layered LiM'O$_2$ component, in which a reference structure has M and M' being manganese, although particular compositions of interest have a portion of the manganese cations substituted with other transition metal cations with appropriate oxidation states. In some embodiments, the positive electrode material can be represented in two component notation as x Li$_2$MO$_3$·(1−x)LiM'O$_2$ where M' is one or more metal cations with an average valance of +3 with at least one cation being a manganese cation or a nickel cation, and where M is one or more metal cations with an average valance of +4. Generally, for compositions of particular interest, M can be considered to be Mn. The general class of compositions are described further, for example, in U.S. Pat. No. 6,680,143 (the '143 patent) to Thackeray et al., entitled "Lithium Metal Oxide Electrodes for Lithium Cells and Batteries," incorporated herein by reference.

The class of positive electrode active materials of interest can be approximately represented with a formula:

$$Li_{1+b}Ni_\alpha Mn_{\beta-\delta}Co_\gamma A_\delta O_{2-z}F_z, \qquad (1)$$

where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. Element A and F (fluorine) are optional cation and anion dopants, respectively. Elements A can be, for example, Mg, Sr, Ba, Cd, Zn, Al, Ga, B, Zr, Ti, Ca, Ce, Y, Nb, Cr, Fe, V, or combinations thereof. The use of a fluorine dopant in lithium rich metal oxides to achieve improved performance is described in copending U.S. patent application Ser. No. 12/569,606 (now published 2010/0086854) to Kumar et al., entitled "Fluorine Doped Lithium Rich Metal Oxide Positive Electrode Battery Materials With High Specific Capacity and Corresponding Batteries," incorporated herein by reference.

Similar compositions have been described in U.S. application Ser. No. 12/246,814 (the '814 application, now published 2010/0086853) to Venkatachalam et al. entitled "Positive Electrode Material for Lithium Ion Batteries Having a High Specific Discharge Capacity and Processes for the Synthesis of these Materials", and U.S. application Ser. No. 12/332,735 (the '735 application, now published 2010/0151332) to Lopez et al. entitled "Positive Electrode Materials for High Discharge Capacity Lithium Ion Batteries", both incorporated herein by reference. As described in the '814 application and the '735 application, surprisingly good performances have been obtained for Li[Li$_{0.2}$Ni$_{0.175}$ Co$_{0.10}$Mn$_{0.525}$]O$_2$ using a co-precipitation synthesis process. As described herein, desirable properties have been obtained with specific engineering of the positive electrode active composition. Also, the desired stoichiometry can be selected based on the selected properties for the material for a particular application.

The formulas presented herein are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Eq. (1) approximately $b+\alpha+\beta+\gamma=1$, then the formula of the composition can be correspondingly approximately written in two component notation as:

$$x \cdot Li_2MO_3 \cdot (1-x)LiM'O_2, \quad (2)$$

where M is one or more metal atoms with an average oxidation state of +4 and M' is one or more metal atoms with an average oxidation state of +3. While Mn, Co and Ni have multiple accessible oxidation states, which directly relates to their use in the active material, in these composite materials if appropriate amounts of these elements are present, it is thought that the elements can have the oxidation states Mn$^{+4}$, Co$^{+3}$ and Ni$^{+2}$. Then, if $\delta=0$, the two component notation simplifies to $x \cdot Li_2MnO_3 \cdot (1-x)LiNi_uMn_uCo_wO_2$, with $2u+w=1$. In some embodiments, the stoichiometric selection of the metal elements can be based on these presumed oxidation states. Based on the oxidation state of dopant element A, corresponding modifications of the formula can be made.

However, active compositions have been found with good performance properties with variations in composition around the reference ranges of compositions described in the previous paragraph. In particular, a range of compositions of interest can be described approximately by the formula $x \cdot Li_2MnO_3 \cdot (1-x)LiNi_{u+\Delta}Mn_{u-\Delta}Co_wO_2$, with $2u+w=1$ and $-0.3 \leq \Delta \leq 0.3$. In some embodiments of particular interest, x ranges from 0.03 to about 0.47, although other ranges are of particular interest for particular performance properties. Furthermore, in some embodiments, u ranges from 0 to about 0.4, and w ranges from 0 to about 0.475, with the proviso that both u and w are not zero. A person of ordinary skill in the art will recognize that additional composition ranges within the explicit ranges above are contemplated and are within the present disclosure.

During the first charge of the lithium ion battery, irreversible changes take place in the battery. For example, at the negative electrode, a solvent electrolyte interface forms with a corresponding consumption of lithium ions. However, in the context of the lithium rich materials described herein, the changes at the positive electrode are of particular interest. Specifically, for the lithium rich compositions herein, the change in the positive electrode during the first charge contributes a majority of the irreversible capacity loss. The irreversible capacity loss only measures structural changes to the positive electrode active materials that result in charge generation during the charge step since the capacity loss is measured based on charge that flows from the positive electrode to the negative electrode during the charge step. Irreversible changes that do not produce current do not contribute to the measured irreversible capacity loss even though cycling capacity of the material may be reduced. The generation of electrons during the charge has a corresponding generation of metal ions at the positive electrode during the charge, and if the metal ions are lithium ions, these ions are in principle available for cycling. If non-lithium metal ions are formed, the dissolution of the metal directly results in an irreversible capacity loss and cycling degradation. Nevertheless, irreversible changes besides dissolution of non-lithium metal can take place that result in irreversible capacity loss, such as oxygen loss. Thus, while a large portion of the initial lithium in the positive electrode can be removed during the initial battery charging, the irreversible capacity loss indicates that all of the lithium cannot return to the positive electrode during discharge of the battery.

With respect to the charging of a battery with the composite materials, the lithium manganese oxide (Li$_2$MnO$_3$) component of the compositions can undergo a reaction to release molecular oxygen with an associated release of 2 Li ions as indicated in equation (3):

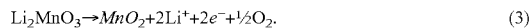

$$Li_2MnO_3 \rightarrow MnO_2 + 2Li^+ + 2e^- + \frac{1}{2}O_2. \quad (3)$$

Upon discharge, the MnO$_2$ composition takes up a single lithium ion and a single electron to form LiMnO$_2$ so that there is an overall significant decrease in capacity due to the irreversible reaction of the material during the initial charge. As discussed below, evidence suggests that the reaction in Eq. (3) takes place at voltages above 4.4 volts. Thus, with the lithium rich layer-layer material, during the first cycle charge above 4.4V, decomposition of a Li$_2$MnO$_3$ component in the high capacity material can lead to oxygen loss and an irreversible capacity loss. The materials in principle can undergo other irreversible changes that may coincide with the initial charge step, such as a decomposition reaction Li$_2$MnO$_3 \rightarrow$MnO$_2$+Li$_2$O. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material. The initial reactions involving the active material are not completely understood.

Based on a layer-layer material with a composition of $x \cdot Li_2MnO_3 \cdot (1-x) LiNi_uMn_uCo_wO_2$, two parameters of the composition are "x" and u/w. As "x" is increased, the material has a greater amount of lithium available. However, as "x" increases, the irreversible capacity loss generally increases so that only a portion of the increased amount of lithium is available for cycling. Nevertheless, some of the increased lithium may be available for cycling with an increase in "x" since the reversible specific capacity increases with "x" at least over a portion of the range in x. The ratio u/w relates to the relative amounts of manganese and nickel relative to cobalt. The relationships that have been found with variations of the u/w ratio are complex. Based on the observed increase in specific capacity over a portion of the range with an increase in "x," the layer-layer crystal structure evidently introduces complexities to the structure.

Differential capacity plots over the first cycle of the battery indicate that a first peak at voltages is observed just below 4 volts presumably resulting from the LiM'O$_2$ component of the active composition while a peak in the vicinity of 4.4 volts is thought to correspond with the reduction of the Li$_2$MnO$_3$ component. The lower voltage peak has a long tail in the plot toward higher voltages suggesting that all of the lithium from the LiM'O$_2$ component may not be extracted when lithium associated with the Li$_2$MnO$_3$ component begins to be extracted. The layer-layer materials are likely more complex than the two component analysis suggests, and the high cycling capacity is consistent with a more complex structure. Similarly, the Li$_2$MnO$_3$ component would seem to cycle with the present of Mn$^{+3}$ following charging without large dissolution of the manganese into the electrolyte, so the complex structure would seem to result in stabilization of the structure consistent with a more complex nature of the material. The further stabilization of the material when a coating is present points to further complexity in the structure, and this complexity produces significant unpredictability in the results obtained herein.

In general, based on the teachings herein, specific active material stoichiometries can be selected to obtain desired performance properties for a resulting battery. For example, even though the active material generally undergoes irreversible changes during the first charge of the battery, the materials with a greater value of x can exhibit a greater initial low rate cycling discharge specific capacity up to a particular value of x. The results in the Examples below indicate that the materials with x=0.4 exhibit a greater value of low rate specific capacity and even higher relative specific capacities at higher rates relative to the materials with x=0.5. Also, other properties can be significant so that the materials with a larger value of x generally have a greater irreversible capacity loss, so materials with a composition corresponding to a lower value of x can be exploited for a decreased value of irreversible capacity loss. In addition, the materials with a lower value of x exhibit a greater average voltage when discharged from 4.6 volts to 2.0 volts, and a greater average voltage can translate into greater energy delivery. It has been found that the true density of the material is a function of the composition. In particular, the true density generally is greater for cathode compositions with lower X. This is an attractive feature to increase the electrode density and increase volumetric energy and power specifications. Improving the volumetric characteristics is useful where it is desirable to reduce cell volume, as in the case of consumer electronics and some automotive applications.

Carbonate and hydroxide co-precipitation processes have been performed for the desired lithium rich metal oxide materials described herein. Generally, a solution is formed from which a metal hydroxide or carbonate is precipitated with the desired metal stoichiometry. The metal hydroxide or carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the hydroxide or carbonate compositions. As demonstrated in the examples below, the resulting lithium rich metal oxide materials formed with the co-precipitation process have improved performance properties. As described in the '735 application above, the co-precipitation processes can be adapted to provide lithium metal oxide powders with a relatively high tap density, which can be exploited with respect to improved performance for a specific battery volume.

Metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The thickness of coating material can be selected to accentuate the observed performance improvements. Metal fluoride coatings designed for excellent performance with lithium rich metal oxides are described further in copending U.S. patent application Ser. No. 12/616,226, now published 2011/0111298 to Lopez et al., entitled "Coated Positive Electrode Materials for Lithium Ion Batteries," incorporated herein by reference.

Also, metal oxides and metal phosphates have also been used as coatings for positive electrode active materials. In the Examples below, results are presented with a coating of MgO for various active compositions along with some results with AlF$_3$ coatings. Metal oxide coatings for use on lithium rich metal oxide active materials are described further in copending U.S. patent application 2011/0076556 to Karthikeyan et al., entitled "Metal Oxide Coated Positive Electrode Materials For Lithium-Based Batteries," incorporated herein by reference.

The use of a coating can provide a decrease in the irreversible capacity loss, although the MgO coatings in the Examples below generally do not result in a significant decrease in irreversible capacity loss. In addition to suggesting reduced changes to the material structure, the decrease in irreversible capacity loss can be advantageous in increasing the energy and power density of a battery. In some embodiments, the coating can result in an increase the specific capacity and the average voltage. These observations suggest that significant differences may take place with respect to changes to the active material in the first charge due to the presence of the coating. These changes are not yet well understood. The increase in cycling discharge capacity due to the coating is clearly directly advantageous with respect to battery performance. Also, the coatings can significantly improve the cycling performance of the battery.

It is useful to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33 C, and other charge and discharge rates can be written in this notation.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials having good properties with respect to specific capacity, tap density, and cycling can provide improved performance for consumers, especially for medium current applications.

The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. Thus, due to the high capacity of the batteries described herein, a battery pack that yields a desired amount of total power can be made in a reasonable volume, and these battery packs can correspondingly achieve the excellent cycling performance.

Positive Electrode Active Materials

The positive electrode active materials comprise lithium rich compositions that generally are believed to form a layered composite crystal structure. In embodiments of particular interest, the lithium metal oxide compositions further comprise Ni, Co and Mn ions with an optional metal dopant. As described herein, the metal stoichiometry can be adjusted to achieve desirable performance properties for resulting batteries incorporating the active materials in the positive electrodes. As noted above, the positive electrode composition can comprise an optional fluorine anion dopant. The presence or absence of a fluorine dopant is not expected to significantly change the issues surrounding the selection of metal cation stoichiometry for the compositions, and the following discussion generally does not include the optional fluorine dopant in the formulas to simplify the discussion. In some embodiments, it is desirable to provide an inert inorganic coating to further stabilize the materials. Coatings are described further in other sections below.

The positive electrode active materials of particular interest can be represented approximately in two component notation as $x\text{Li}_2\text{MnO}_3 \cdot (1-x) \text{LiMO}_2$, where M is two or more metal elements with an average valance of +3 and with one of the metal elements being Mn and with another metal element being Ni and/or Co. In general, $0<x<1$, but in some embodiments $0.03 \leq x \leq 0.47$, in further embodiments $0.075 \leq x \leq 0.46$, in additional embodiments $0.1 \leq x \leq 0.45$, and in other embodiments $0.15 \leq x \leq 0.425$. In further embodiments, desired ranges of x can be selected based on certain performance parameters, such as long term cycling, average voltage or DC electrical resistance. Thus, depending on the particular performance parameters selected for particular interest, $0.24 \leq x \leq 0.4$, in further embodiments $0.25 \leq x \leq 0.375$, and in other embodiments $0.26 \leq x \leq 0.36$. Similarly, in with an emphasis on other performance parameters, $0.15 \leq x \leq 0.325$, in further embodiments $0.16 \leq x \leq 0.32$, and in additional embodiments $0.175 \leq x \leq 0.31$. A person of ordinary skill in the art will recognize that additional ranges of the composition parameter x within the explicit ranges above are contemplated and are within the present disclosure. For example, M can be a combination of nickel, cobalt and manganese, which can be in oxidation states $\text{Ni}^{+2}$, $\text{Co}^{+3}$ and $\text{Mn}^{+4}$. The overall formula for these compositions can be written as $\text{Li}_{2(1+x)/(2+x)}\text{Mn}_{2x/(2+x)}\text{M}_{(2-2x)/(2+x)}\text{O}_2$. In the overall formula, the total amount of manganese has contributions from both constituents listed in the two component notation. Thus, in some sense the compositions are manganese rich.

In general, M is a combination of manganese as well as nickel and/or cobalt, and optionally one or more dopant metals. Thus, M can be written as $\text{Ni}_u\text{Mn}_v\text{Co}_w\text{A}_y$. For embodiments in which $y=0$, this simplifies to $\text{Ni}_u\text{Mn}_v\text{Co}_w$. If M includes Ni, Co, Mn, and optionally A the composition can be written alternatively in two component notation and single component notation as the following.

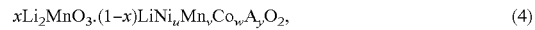

$$x\text{Li}_2\text{MnO}_3 \cdot (1-x)\text{LiNi}_u\text{Mn}_v\text{Co}_w\text{A}_y\text{O}_2, \quad (4)$$

$$\text{Li}_{1+b}\text{Ni}_\alpha\text{Mn}_\beta\text{Co}_\gamma\text{A}_\delta\text{O}_2, \quad (5)$$

with $u+v+w+y \approx 1$ and $b+\alpha+\beta+\gamma+\delta \approx 1$. The reconciliation of these two formulas leads to the following relationships:

$$b = x/(2+x),$$

$$\alpha = 2u(1-x)/(2+x),$$

$$\beta = 2x/(2+x) + 2v(1-x)/(2+x),$$

$$\gamma = 2w(1-x)/(2+x),$$

$$\delta = 2y(1-x)/(2+x),$$

and similarly, $$x = 2b/(1-b),$$

$$u = \alpha/(1-3b),$$

$$v = (\beta - 2b)/(1-3b),$$

$$w = \gamma/(1-3b),$$

$$y = \delta/(1-3b).$$

In some embodiments, it is desirable to have $u \approx v$, such that $\text{Li Ni}_u\text{Mn}_v\text{Co}_w\text{A}_y\text{O}_2$ becomes approximately $\text{Li Ni}_u\text{Mn}_u\text{Co}_w\text{A}_y\text{O}_2$. In this composition, when $y=0$, the average valance of Ni, Co and Mn is +3, and if $u \approx v$, then these elements can be believed to have valances of approximately $\text{Ni}^{+2}$, $\text{Co}^{+3}$ and $\text{Mn}^{+4}$. When the lithium is hypothetically fully extracted, all of the elements go to a +4 valance. A balance of Ni and Mn can provide for Mn to remain in a +4 valance as the material is cycled in the battery. This balance avoids the formation of $\text{Mn}^{+3}$, which has been associated with dissolution of Mn into the electrolyte and a corresponding loss of capacity.

As noted above the $\text{Li}_2\text{MnO}_3$ component may give off molecular oxygen upon extraction of the lithium with the resulting formation of $\text{MnO}_2$, which then could cycle with $\text{LiMnO}_2$ upon recharging of the battery. In these materials, the resulting $\text{Mn}^{+3}$ seems to be relatively stable with respect to dissolution if $\text{Mn}^{+3}$ is formed from the $\text{Li}_2\text{MnO}_3$. Since the initial composition loses two lithium atoms with the generation of 2 electrons and since the product composition has only a single lithium atom to cycle with the exchange of a single electron, this composition change results in the irreversible capacity loss. Furthermore, evidence suggests more complex changes to the crystal structure during the first cycle formation step so that the amount of oxygen loss may not correspond to the stoichiometric amount of active $\text{Li}_2\text{MnO}_3$ based on the amount of metal incorporated into the composition. Also, coating of the composition with an inorganic coating material further influences this chemistry, as evidenced by the change in the specific capacity as well as the irreversible capacity loss. Furthermore, for coated samples, the average voltage can increase relative to uncoated samples. The underlying chemistry contributing to the excellent performance of these materials is not completely understood.

With respect to the one component notation, the lithium rich metal oxide compositions of particular interest can be described by the formula $\text{Li}_{1+b}\text{Ni}_\alpha\text{Mn}_\beta\text{Co}_\gamma\text{A}_\delta\text{O}_2$, where b ranges from about 0.015 to about 0.19, $\alpha$ ranges from 0 to about 0.4, $\beta$ ranges from about 0.2 to about 0.65, $\gamma$ ranges from 0 to about 0.46, $\delta$ ranges from about 0 to about 0.1 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, or combinations thereof. In some embodiments, $\alpha$ ranges from about 0.1 to about 0.3, β range from about 0.3 to about 0.65, γ ranges from about 0.05 to about 0.4. With respect to the amount of dopant A present in the composition, in further embodiments δ ranges from about 0.001 to about 0.09 and in additional embodiments from about 0.005 to about 0.075. A person of ordinary skill in the art will recognize that additional ranges of parameter values within the explicit ranges above are contemplated and are within the present disclosure.

In embodiments in which the sum b+α+β+γ+δ in the formula for the positive electrode active material approximately equals 1.0, then the composition can necessarily be written in the two component notation noted above. However, even if the composition can be written in two component notation, the crystal structure of the composition does not necessarily have components indicative of the different materials. Data in the examples below provides evidence that, at least for some of the embodiments, x-ray diffraction lines corresponding to $Li_2MnO_3$ can be observed along with lines corresponding to $LiMO_2$.

With respect to some embodiments of materials described herein, Thackeray and coworkers have proposed a composite crystal structure for some lithium rich metal oxide compositions in which a $Li_2MO_3$ composition is structurally integrated into a layered structure with a $LiM'O_2$ component. Batteries formed from these materials have been observed to cycle at high voltages and with higher capacities relative to batteries formed with corresponding $LiMO_2$ compositions. These materials are described generally in U.S. Pat. No. 6,680,143 to Thackeray et al., entitled Lithium Metal Oxide Electrodes for Lithium Cells and Batteries," and U.S. Pat. No. 6,677,082 to Thackeray et al., entitled "Lithium Metal Oxide Electrodes for Lithium Cells and Batteries," both of which are incorporated herein by reference. Thackeray identified Mn, Ti, and Zr as being of particular interest as M' and Mn and Ni for M.

The structure of some specific layered structures is described further in Thackeray et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

Recently, Kang and coworkers described a composition for use in secondary batteries with the formula $Li_{1+x}Ni_{\alpha}Mn_{\beta}Co_{\gamma}M'_{\delta}O_{2-z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. This reference reported a cathode material with a capacity below 250 mAh/g (milli-ampere hours per gram) at room temperature after 10 cycles, which is at an unspecified rate that can be assumed to be low to increase the performance value. Kang et al. examined various specific compositions including $Li_{1.2}Ni_{0.15}Mn_{0.55}Co_{0.10}O_2$, which corresponds with an x=0.5 composition. The effects of fluorine doping for lithium rich and manganese rich lithium metal oxides is described further in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference.

The results obtained in the '072 patent involved a solid state synthesis of the materials that did not achieve comparable cycling capacity of the batteries formed with cathode active materials formed with co-precipitation methods. The improved performance of the materials formed by co-precipitation is described further in the '814 application and '735 application noted above as well as in US 2010/0086854 for fluorine doped compositions. The co-precipitation process for the doped materials described herein is described further below.

The performance of the positive electrode active materials is influenced by many factors. As described herein, the compositions of the materials can be selected to achieve desired performance parameters for a particular battery application. In particular, it is believed that the compositions with u≈v in the formula above results in relatively stable cycling. This observation would be consistent with results observed in the '814 application and the '735 application, the compositions in the '814 application and the '735 application had stoichiometries somewhat varied from u≈v. Also, since the $Li_2MnO_3$ component can result potentially in some amount of Mn+3 that can cycle relatively stably in the complex lattice of the lithium rich and manganese rich compositions described herein.

Based on these observations and the results in the examples below, the composition of particular interested can be represented approximately by the formula:

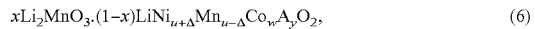

$$xLi_2MnO_3 \cdot (1-x)LiNi_{u+\Delta}Mn_{u-\Delta}Co_wA_yO_2, \quad (6)$$

where the absolute value of Δ generally is no more than about 0.3 (−0.3≤Δ≤0.3), in some embodiments no more than about 0.2 (−0.2≤Δ≤0.2), in other embodiments 0.175 (−0.175≤Δ≤0.175) and in further embodiments no more than about 0.15 (−0.15≤Δ≤0.15). Desirable ranges for x are given above. With 2u+w+y≈1, desirable ranges of parameters are in some embodiments 0≤w≤1, 0≤u≤0.5, 0≤y≤0.1 (with the proviso that both u and w are not zero), in further embodiments, 0.1≤w≤0.6, 0.1≤u≤0.45, 0≤y≤0.075, and in additional embodiments 0.24≤w≤0.475, 0.25≤u≤0.4, 0≤y≤0.05. Each set of values within these ranges can be independently selected to achieve desired performance values and compositions for each value of x within the specific ranges of x described in detail above. A person of ordinary skill in the art will recognize that additional ranges of composition parameters within the explicit ranges above are contemplated and are within the present disclosure. As used herein, the notation (value1≤variable≤value2) implicitly assumes that value 1 and value 2 are approximate quantities.

The mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode. The synthesis approaches described in the following section have been found to have the capability of producing powders of the active materials described herein with appropriate tap densities to provide resulting batteries with desired performance for most commercial applications.

Synthesis Methods

Synthesis approaches described herein can be used to form layer-layer lithium rich positive electrode active materials with high values of specific capacity and a relatively high tap density. The synthesis methods have been adapted for the synthesis of compositions with the formula $Li_{1+b}Ni_\alpha Mn_\beta Co_\gamma A_\delta O_{2-z}F_z$ and the desired parameter ranges, as described above. The synthesis approaches are also suitable for commercial scale up. Specifically, co-precipitation process can be used to synthesize the desired lithium rich positive electrode materials with desirable results.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1 M and 3 M. The relative molar quantities of metal salts can be selected based on the desired formula for the product materials. Similarly, the optional dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. A fluoride, such as $MgF_2$, can be added to introduce a fluoride dopant. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '814 application referenced above. Further details of the carbonate co-precipitation process are described in the '735 application referenced above.

Coatings and Methods for Forming the Coatings

Inorganic coatings, such as metal fluoride coatings and metal oxide coatings, have been found to significantly improve the performance of the lithium rich layered positive electrode active materials described herein, although the coatings are believed to be inert with respect to battery cycling. In particular, the cycling properties of the batteries formed from metal fluoride coated lithium metal oxide have been found to significantly improve from the uncoated material, although inert metal oxide coatings and metal phosphate coatings have also been found to yield desirable properties. Additionally, the specific capacity of the batteries also shows desirable properties with the coatings, and the irreversible capacity loss of the first cycle of the battery can be reduced. As discussed above, first cycle irreversible capacity loss of a battery is the difference between the charge capacity of the new battery and its first discharge capacity. For the batteries described herein, significant portion of the first cycle irreversible capacity loss is generally attributed to the positive electrode material. When the coating is appropriately selected, these advantageous properties from the coating are maintained for the compositions described herein with specifically selected stoichiometries to achieve desired performance parameters.

In the Examples below, performance properties are obtained for the active materials coated with magnesium oxide, MgO, and with aluminum fluoride, $AlF_3$. The magnesium oxide coatings provide for an increase in the specific capacity of the active material, and the magnesium oxide coatings can be expected to improve the longer term cycling properties of the positive electrode active materials. However, the MgO coatings do not result in a decrease of the irreversible capacity loss of the materials. The $AlF_3$ coatings are found to decrease irreversible capacity loss as well as to increase the specific capacity.

In general, other metal oxide coatings, as an alternative to MgO, can also be used effectively, and other metal fluorides or metalloid fluorides can also be used for the coating. Similarly, a coating with a combination of metal and/or metalloid elements can be used. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '814 application and the '735 application cited above, as well as copending U.S. patent application Ser. No. 12/616,226, now published 2011/0111298 to Lopez et al., entitled "Coated Positive Electrode Materials for Lithium Ion Batteries," which is incorporated herein by reference.

An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al. "Enhancing the rate capability of high capacity $xLi_2MnO_3$ $(1-x)LiMO_2$ (M=Mn, Ni, Co) electrodes by Li—$N_1$—$PO_4$ treatment," Electrochemistry Communications 11, 748-751 (2009), incorporated herein by reference, and this article can be referenced generally with respect to the formation of metal phosphate coatings.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. Further discussion of the effects on the performance properties for coated lithium rich lithium metal oxides is found in copending U.S. patent application Ser. No. 12/616,226, now published 2011/0111298 to Lopez et al., entitled "Coated Positive Electrode Materials for Lithium Ion Batteries," incorporated herein by reference.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is a material that takes up lithium during charging and releases lithium during discharging. If elemental lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\le1$ or $Li_{1+x}Ti_{2-x}O_4$, $0\le x\le\frac{1}{3}$. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference.

The positive electrode active compositions and negative electrode active compositions generally are powders that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, the batteries can be constructed based on the method described in published U.S. patent application 2009/0263707 to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992, now published 2011/0136019 filed on Dec. 4, 2009 to Amiruddin et al., entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them and configured to form a desired battery structure. Appropriate electrically conductive tabs can be welded or the like to the current collectors, and the resulting electrode structure can be placed into a metal canister or polymer package, with the negative tab and positive tab welded to appropriate external contacts. Electrolyte is added to the canister, and the canister is sealed to complete the battery. Desirable pouch battery designs are described further in copending U.S. provisional patent application 61/369,825 to Kumar et al., entitled "Battery Packs for Vehicles and High Capacity Pouch Secondary Batteries for Incorporation Into Compact Battery Packs," incorporated herein by reference.

Battery Performance

Batteries formed from the specific positive electrode active materials described herein have demonstrated superior performance under realistic discharge conditions for moderate current applications. In particular, the doped active materials have exhibited high average discharge voltages and high specific capacities upon cycling of the batteries at low and moderate discharge rates. Based on the cycling results obtain in the examples below and on related materials, it is expected that the materials will exhibit good cycling properties out to relative long numbers of cycles.

In general, various similar testing procedures can be used to evaluate the battery performance. A specific testing procedure is described for the evaluation of the performance values described herein. The testing procedure is described in more detail in the examples below. Specifically, the battery can be cycled between 4.6 volts and 2.0 volts at room temperature. The evaluation over the range from 4.6 volts to 2.0 volts is desirable for commercial use since the batteries with active materials described herein generally have stable cycling over this voltage range. In some embodiments, for the first two cycles, a battery is discharged at a rate of C/10 to establish irreversible capacity loss. Then, the battery is cycled for two cycles at C/5, two cycles at C/3, five cycles at 1 C, five cycles at 2 C, five cycles at 5 C and three more cycles at C/5. Again, the notation C/x implies that the battery is discharged at a rate to discharge the battery to the selected voltage limit in x hours. The battery capacity depends significantly on the discharge rate, with reduced capacity as the discharge rate increases.

In some embodiments, the positive electrode active material can exhibit a specific discharge capacity of at least about 260 mAh/g and in some embodiments at least about 270 mAh/g at a discharge rate of C/3 when discharged from 4.6V to 2.0V. A person of ordinary skill in the art will recognize that additional ranges of specific capacity and cycling capacity within the specific ranges above are contemplated and are within the present disclosure.

The average voltage of a material can be a significant parameter. A higher average voltage can indicate the ability to deliver additional power. In some embodiments with a lithium metal negative electrode active material, the average voltage can be at least about 3.60 volts, in further embodiments at least about 3.64 volts and in additional embodiments at least about 3.65 volts, when discharged at a C/10 rate between 4.6 volts and 2.0 volts. In some embodiments of batteries, such as pouch cells, with a graphitic carbon negative electrode active material, the average voltage can be at least about 3.45 volts, in further embodiments at least about 3.475 volts and in additional embodiments from about 3.50 volts to about 3.60 volts, when discharged at a C/10 rate between 4.5 volts and 2.0 volts. Also, for the batteries with a graphitic carbon negative electrode active material, the average voltage at the 250th discharge cycle can be at least about 3.25 volts, and in further embodiments at least about 3.3 volts and in additional embodiments at least about 3.325 volts, when discharged at a C/3 rate between 4.5 volts and 2.0 volts. A person of ordinary skill in the art will recognize that additional ranges of average voltage within the explicit ranges above are contemplated and are within the present disclosure.

It is also useful to evaluate the DC resistance profiles as a function of state of charge. The DC resistance from a 10 second pulse is defined as the change in voltage from the beginning of the pulse to the end of the pulse divided by the change in current at the beginning of the pulse and at the end of the pulse. The batteries described herein can exhibit a DC resistance at a 1 hour rate (1C) in a 10 second pulse test for both charging and discharging that is no more than about 6 milliohms with a state of charge of at least about 30%, in other embodiments with a state of charge at least about 25%, and in further embodiments with a state of charge of at least about 20%. In some embodiments, the batteries exhibit a DC discharge resistance of no more than about 5 milliohms at a state of charge of at least about 35%, in further embodiments at least about 30% and in other embodiments at least about 25%. A person of ordinary skill in the art will recognize that additional ranges of DC resistance performance within the explicit ranges above are contemplated and are within the present disclosure.

As noted above, the teachings herein provide for the design of a lithium rich positive electrode composition with a desired balance of properties. While specific capacity tends to increase with increasing values of x, at least up to some value of x, other parameters, such as long term cycling, average voltage and DC resistance tend to have more desirable properties at lower values of x. An appreciation of these dependencies has pointed to new composition ranges that can provide superior performance for many applications of interest, such as vehicle applications and consumer electronics.

EXAMPLES

The following examples are directed to the evaluation of ranges of compositions with selected amounts of metals being selected based on an overall stoichiometry of $LiMO_2$, where M is a combination of metal elements Li, Ni, Co and Mn. Results are presented with and without a coating to stabilize the composition. The electrochemistry is also studied during the first charge/discharge step to elucidate the stoichiometric effects on the electrochemistry.

The coin cell batteries tested in Examples 3, 4 and 6 were performed using coin cell batteries produced following a procedure outlined here. Example 7 describes battery performance results obtained using pouch batteries, and the formation of the pouch batteries is described in Example 7. The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

The positive electrode was placed inside an argon filled glove box for the fabrication of the coin cell batteries. Lithium foil (FMC Lithium) having thickness of roughly 125 microns was used as a negative electrode. The electrolyte was selected to be stable at high voltages, and appropriate electrolytes are described in copending U.S. patent application Ser. No. 12/630,992, now published 2011/0136019 to Amiruddin et al., entitled "Lithium Ion Battery With High Voltage Electrolytes and Additives," incorporated herein by reference. A trilayer (polypropylene/polyethylene/polypropylene) microporous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 1

Synthesis of Lithium Rich Complex Metal Oxides

This example demonstrates the formation of a desired positive electrode active material using a carbonate or hydroxide co-precipitation process. Stoichiometric amounts of metal precursors were dissolved in distilled water to form an aqueous solution with the metal salts in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept between room temperature and 80° C. The pH of the reaction mixture was in the range from 6-12. In general, the aqueous transition metal solution had a concentration from 1 M to 3 M, and the aqueous $Na_2CO_3/NH_4OH$ solution had a $Na_2CO_3$ concentration of 1 M to 4 M and/or a $NH_4OH$ concentration of 0.2-2M. The metal carbonate or hydroxide precipitate was filtered, washed multiple times with distilled water, and dried at 110° C. for about 16 hrs to form a metal carbonate or hydroxide powder. Specific ranges of reaction conditions for the preparation of the samples are further outlined in Table 1, where the solution may not include both $Na_2CO_3$ and $NH_4OH$.

TABLE 1

| Reaction Process Condition | Values |
| --- | --- |
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ | 1-4M |
| Concentration of $NH_4OH$ | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate or hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide, followed by an additional mixing step to further homogenize the powder. The further homogenized powder was again calcined to form the highly crystalline lithium composite oxide. Specific ranges of calcination conditions are further outlined in Table 2 (scfh is a standard cubic foot per hour).

TABLE 2

| | Calcination Process Condition | Values |
| --- | --- | --- |
| $1^{st}$ Step | temperature | 400-800° C. |
| | time | 1-24 hr |
| | protective gas | Nitrogen or Air |
| | Flow rate of protective gas | 0-50 scfh |
| $2^{nd}$ Step | temperature | 700-1100° C. |
| | time | 1-36 hr |
| | protective gas | Nitrogen or Air |
| | Flow rate of protective gas | 0-50 scfh |

Figure 2:
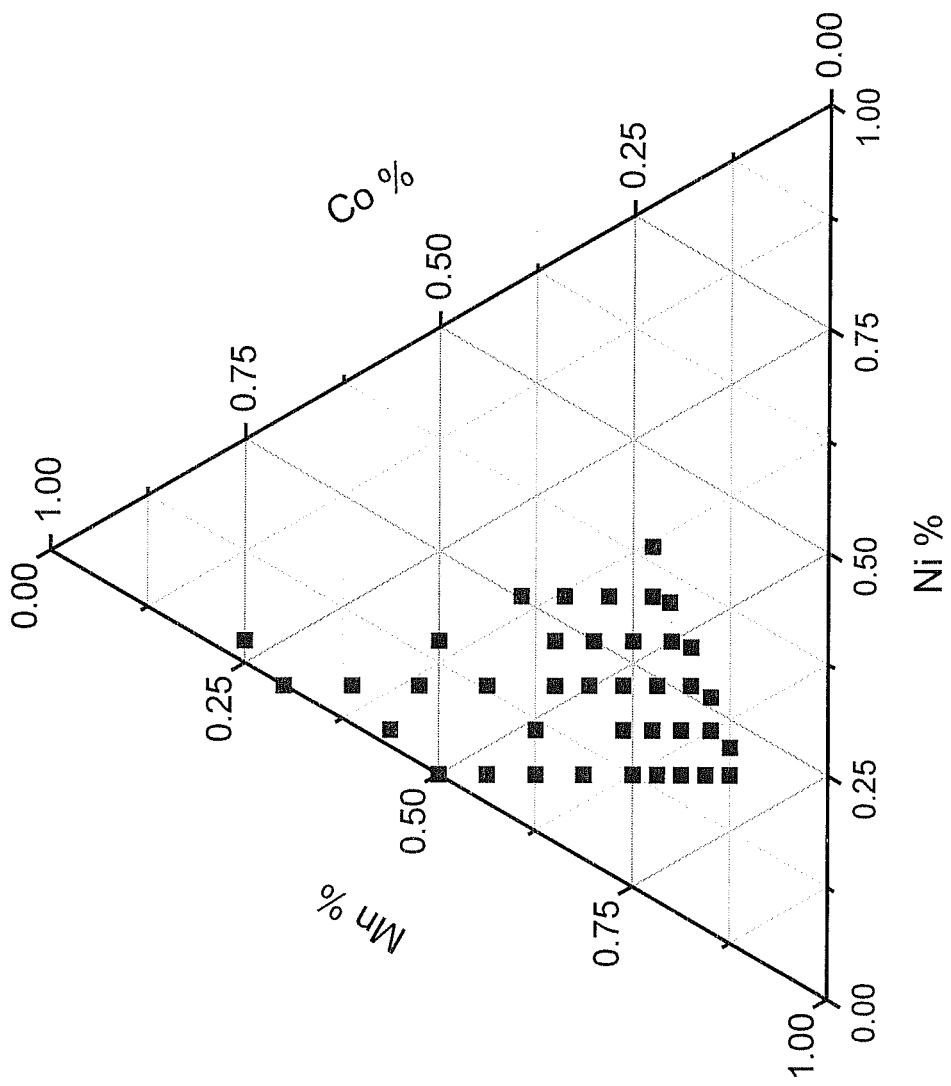
FIG. 2 is a compositional phase diagram indicating the relative amounts of transition metals in compositions formed in the Examples.

The positive electrode composite material particles thus formed generally have a substantially spherical shape and are relatively homogenous in size. The product composition was assumed to correspond to the portions of the metal reactants used to form the composition with the oxygen adjusting to yield the overall targeted oxidation state. As discussed in the above sections, the overall formula for these compositions can be written as $x\,Li_2MnO_3\cdot(1-x)\,Li\,Ni_uMn_vCo_wO_2$ (formula I) or $Li_{1+b}Ni_\alpha Co_\gamma Mn_\beta O_2$ (formula II). Two sets of compositions were formed. For the first set, variations of compositions were synthesized having u=v. As seen in Table 3, a total of 34 cathode compositions ranging in X from 0.1 to 0.5 and in Mn % from 35% to 70% were synthesized. The relationship between the Ni, Co, and Mn present in the compositions are further illustrated in FIG. 2. For the second set of compositions, u does not equal to v and again x=0.1, 0.2, 0.3, 0.4 or 0.5. Table 4 shows 5 different synthesized cathode compositions and their corresponding Mn %.

TABLE 3

| Composition | x Li Component | Mn % Transition Metals |
| --- | --- | --- |
| 1 | 0.500 | 68.75 |
| 2 | 0.500 | 67.25 |
| 3 | 0.500 | 65.62 |
| 4 | 0.500 | 64.12 |
| 5 | 0.500 | 62.50 |
| 6 | 0.500 | 59.37 |
| 7 | 0.500 | 56.25 |
| 8 | 0.500 | 53.12 |
| 9 | 0.500 | 50.00 |
| 10 | 0.400 | 62.54 |
| 11 | 0.400 | 60.62 |
| 12 | 0.400 | 58.82 |
| 13 | 0.400 | 56.90 |
| 14 | 0.400 | 51.26 |
| 15 | 0.400 | 41.90 |
| 16 | 0.300 | 56.21 |
| 17 | 0.300 | 54.02 |
| 18 | 0.300 | 51.84 |
| 19 | 0.300 | 49.66 |
| 20 | 0.300 | 47.47 |
| 21 | 0.300 | 43.10 |
| 22 | 0.300 | 38.74 |
| 23 | 0.300 | 34.37 |
| 24 | 0.300 | 30.00 |
| 25 | 0.200 | 50.05 |
| 26 | 0.200 | 47.52 |
| 27 | 0.200 | 44.99 |
| 28 | 0.200 | 42.46 |
| 29 | 0.200 | 34.98 |
| 30 | 0.200 | 22.55 |
| 31 | 0.100 | 43.80 |
| 32 | 0.100 | 40.97 |
| 33 | 0.100 | 38.13 |
| 34 | 0.100 | 35.29 |

TABLE 4

| Composition | x in $xLi_2MnO_3\cdot(1-x)LiMO_2$ | Mn % Transition Metal |
| --- | --- | --- |
| 35 | 0.5 | 65.63 |
| 36 | 0.4 | 58.75 |
| 37 | 0.3 | 51.90 |
| 38 | 0.2 | 45.49 |
| 39 | 0.1 | 38.13 |

Figure 3:
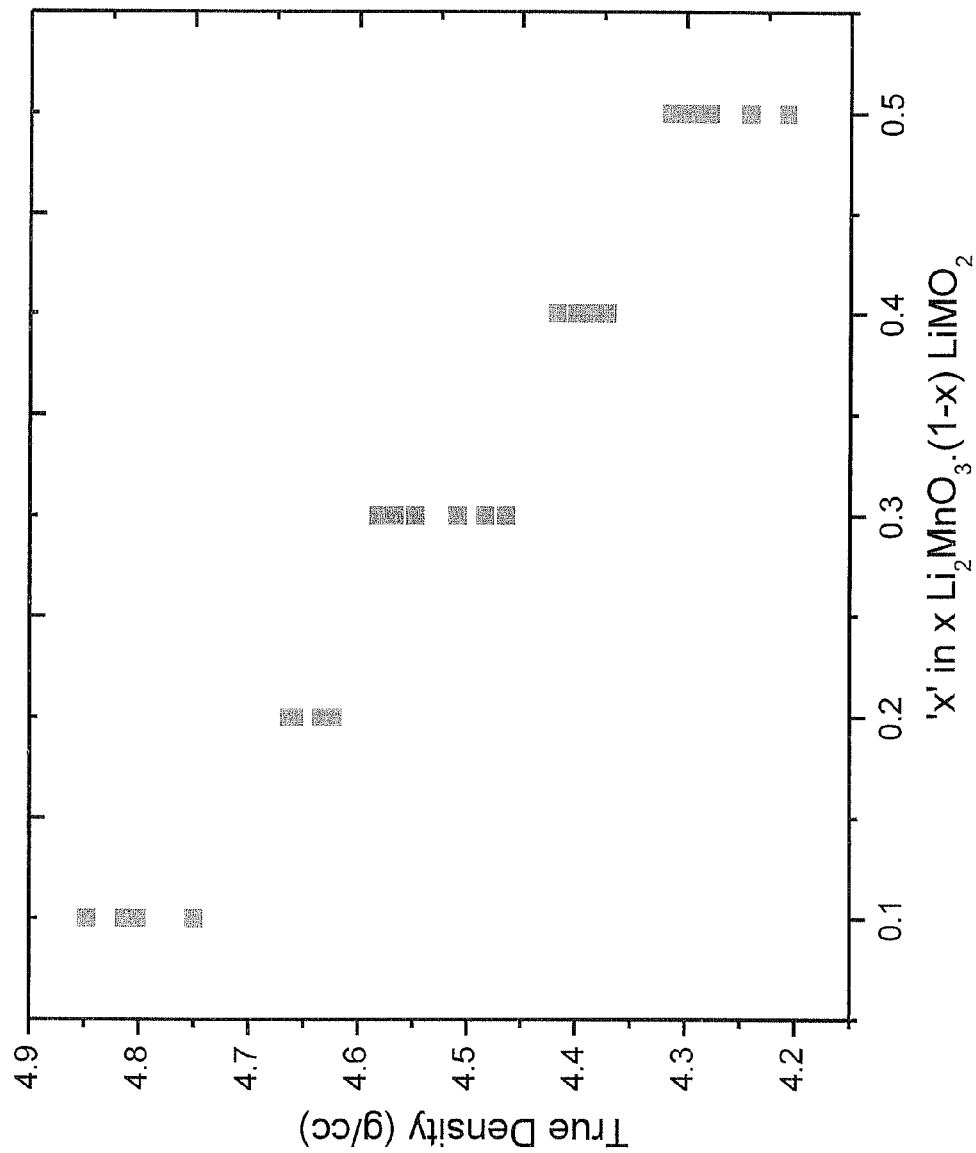
FIG. 3 is a plot of true density as a function of X in the composition of the positive electrode active material.
Figure 4:
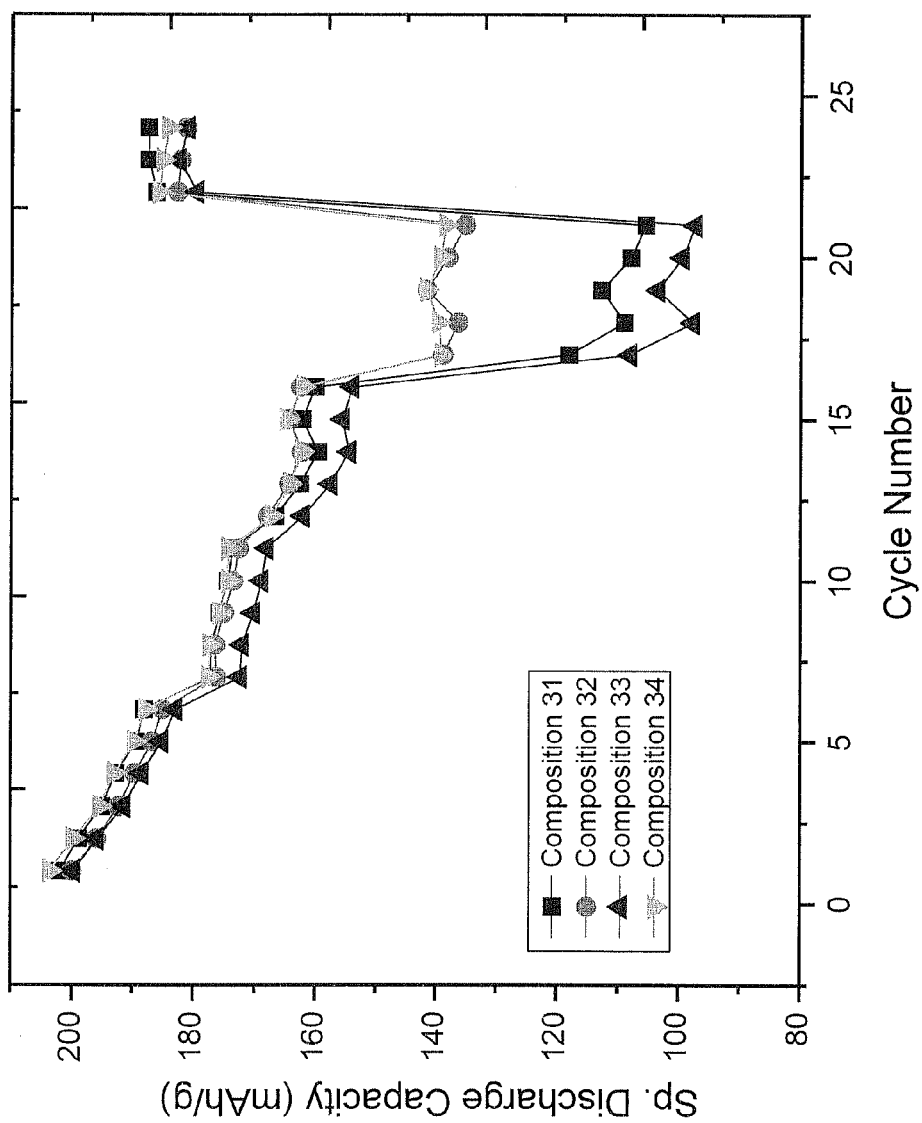
FIG. 4 is a is a set of plots of specific capacity versus cycle number of a set of lithium rich metal oxides with values of X=0.1 cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.
Figure 5:
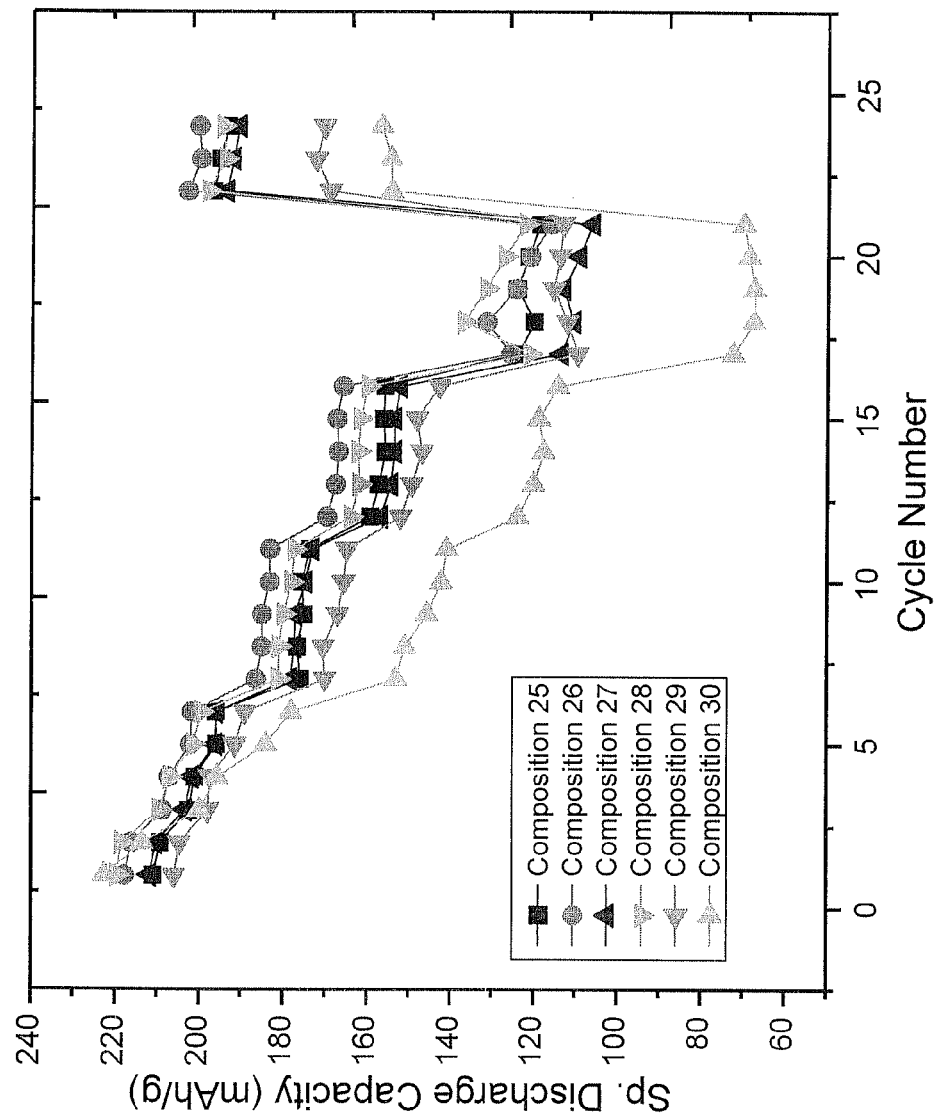
FIG. 5 is a is a set of plots of specific capacity versus cycle number of a set of lithium rich metal oxides with values of X=0.2 cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.
Figure 6:
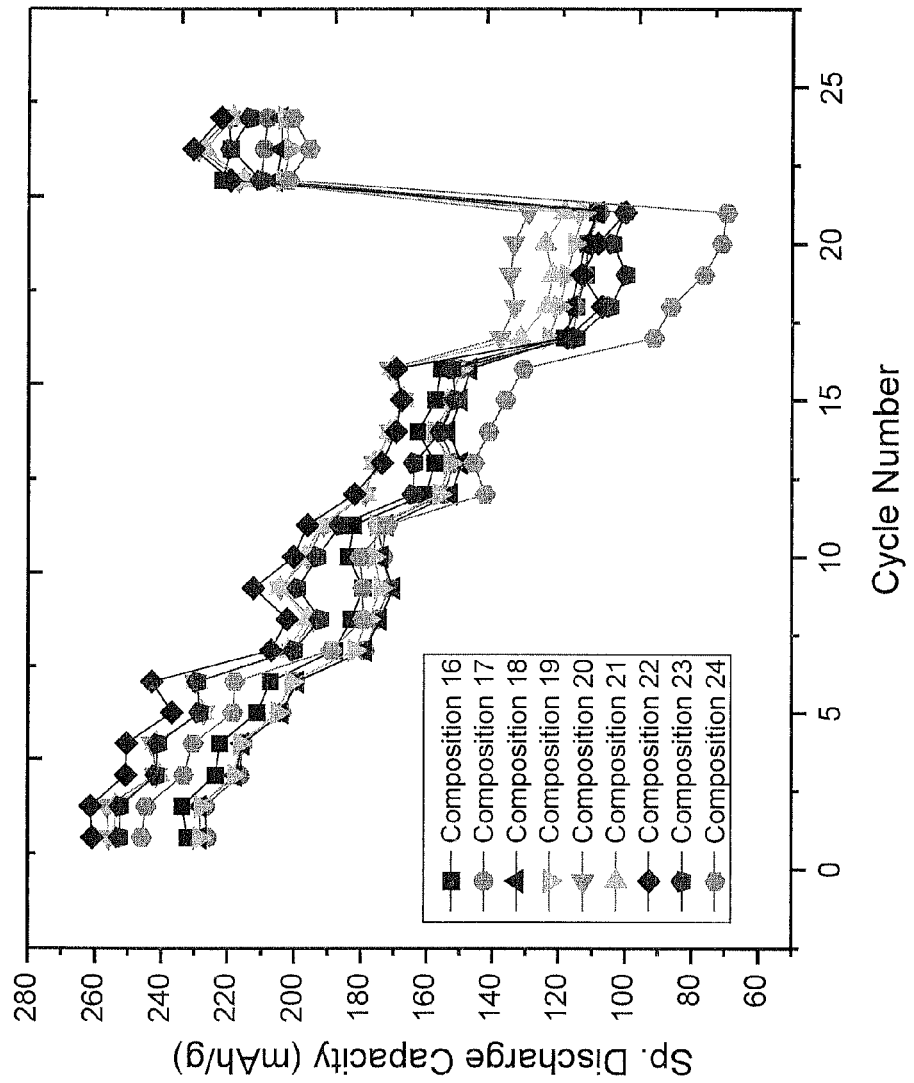
FIG. 6 is a is a set of plots of specific capacity versus cycle number of a set of lithium rich metal oxides with values of X=0.3 cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.
Figure 7:
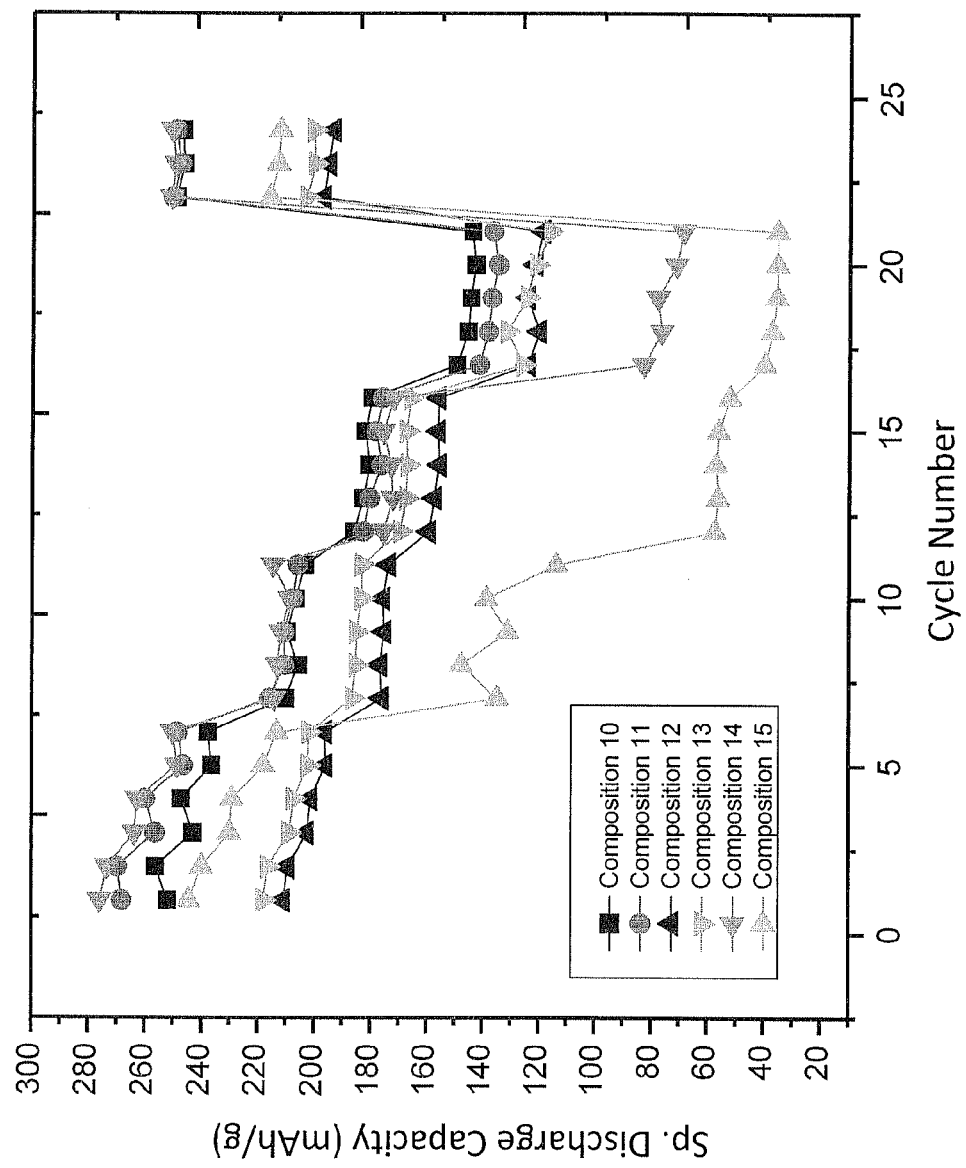
FIG. 7 is a is a set of plots of specific capacity versus cycle number of a set of lithium rich metal oxides with values of X=0.4 cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.
Figure 8:
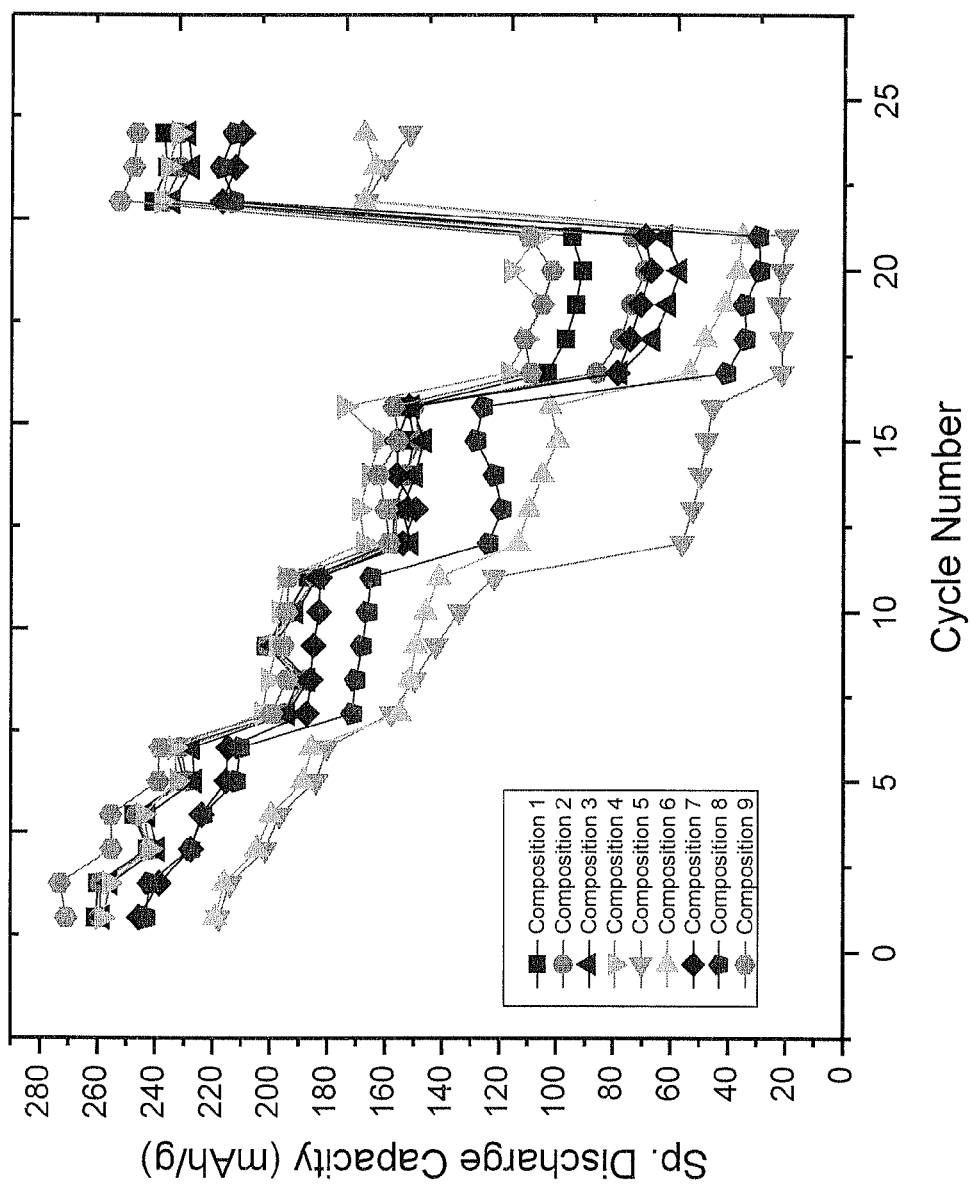
FIG. 8 is a is a set of plots of specific capacity versus cycle number of a set of lithium rich metal oxides with values of X=0.5 cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.

The true density of the highly crystalline compositions was obtained using helium picnometry. Referring to FIG. 3, the densities are plotted as a function of the value of x in $x\,Li_2MnO_3\cdot(1-x)\,LiMO_2$. While there is a slight scatter in the points, generally the true density is greater for compositions with lower amounts of X. Assuming that similar cathode particle morphology (particle size, porosity and surface area) can be obtained for the different X cathode compositions, a higher electrode density can be obtained for lower X compositions where the true density is higher. With respect to obtaining a desired higher loading of powders in the electrode, these respective properties can be appropriately balanced with other performance properties.

A portion of the compositions in both sets were coated with magnesium oxide as a stabilization composition as described in Example 2 below. The coated and uncoated compositions were then used to form coin cell batteries following the procedure outlined above. The coin cell batteries were tested, and the results are described below in Examples 3 (first set of compositions) and Example 4 (second set of compositions).

Additionally, a portion of the compositions from both set were coated with aluminum oxide as described in Example 5 below. The coated and uncoated compositions were then used to from coin cell batteries following the procedure outlined above. The coin cell batteries were tested, and the results are described below in Examples 6.

Example 2

Formation of MgO Coated Metal Oxide Materials

As described in this example, a portion of the LMO compositions synthesized as described in Example 1 were coated with magnesium oxide as a stabilizing coating. Application of a magnesium oxide coating over LMO material was performed by drying a magnesium composition onto the LMO followed by a calcination step. Specifically, magnesium nitrate was dissolved in a selected amount of water, and the positive electrode active material to be coated with MgO was dispersed in the magnesium nitrate solution. Then, this mixture was heated at a sufficient temperature for a few hours until reaching dryness. The dry powder was collected and fired at a temperature from 300-500° C. for 1-5 h in a conventional muffle furnace in a dry air. The LMO coated with about 0.5 wt % MgO were then used to form coin cell batteries following the procedure outlined above. The coin cell batteries were tested, and the results are described in examples below.

Example 3

Battery Performance—First Set of Compositions

This example demonstrates the battery performance of coin cells formed with the lithium metal oxides with and without magnesium oxide coatings from Examples 1 and 2 above.

Figure 9:
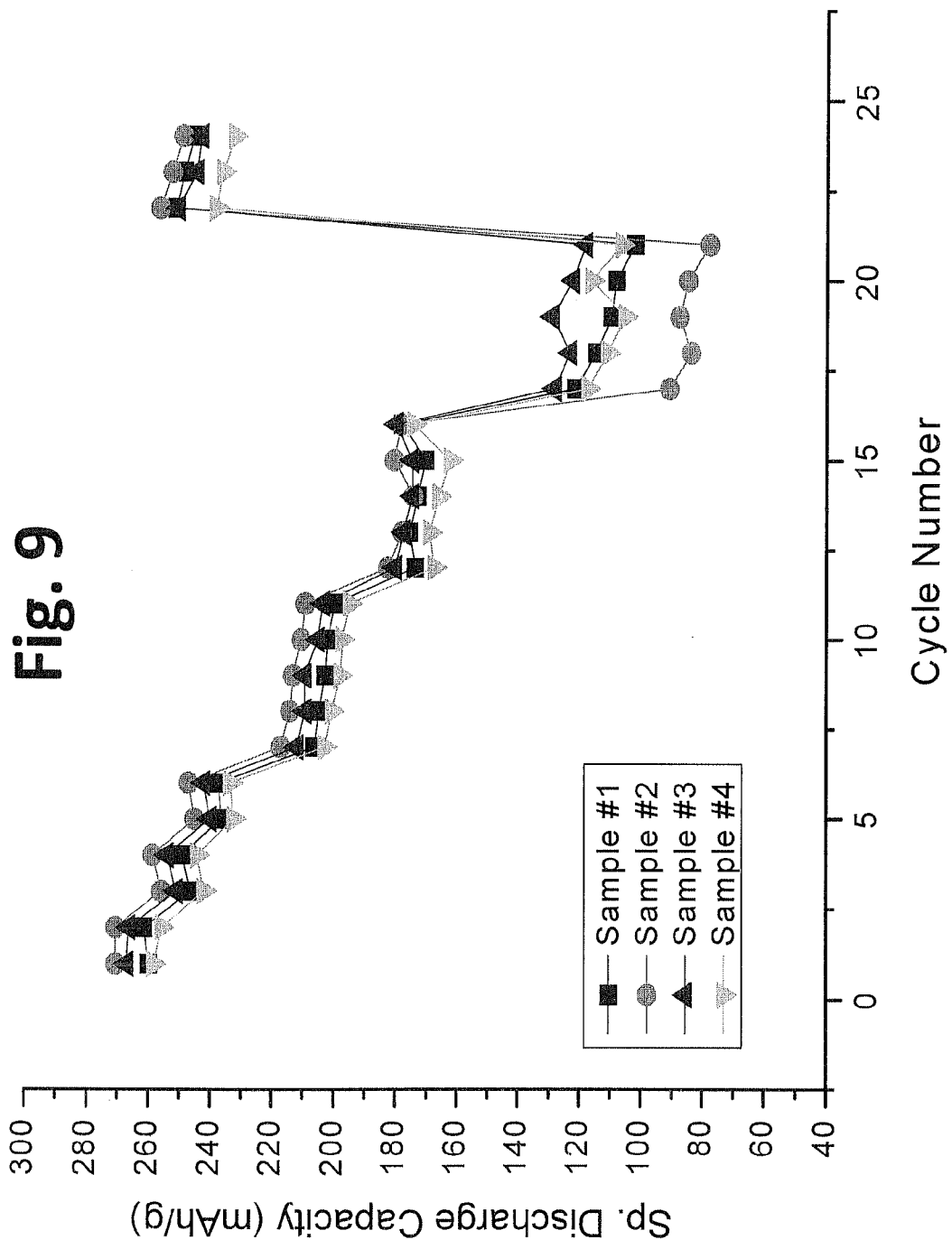
FIG. 9 is a is a set of plots of specific capacity versus cycle number of a set of lithium rich metal oxides with values of X=0.5 having a coating of 0.5 weight percent MgO cycled at 0.1 C for the first two cycles, 0.2 C for cycle numbers 3 and 4, 0.33 C for cycle numbers 5 and 6, 1 C for cycle numbers 7-11, 2 C for cycle numbers 12-16, 5 C for cycle numbers 17-21 and 0.2 C for cycle numbers 22-24.
Figure 10:
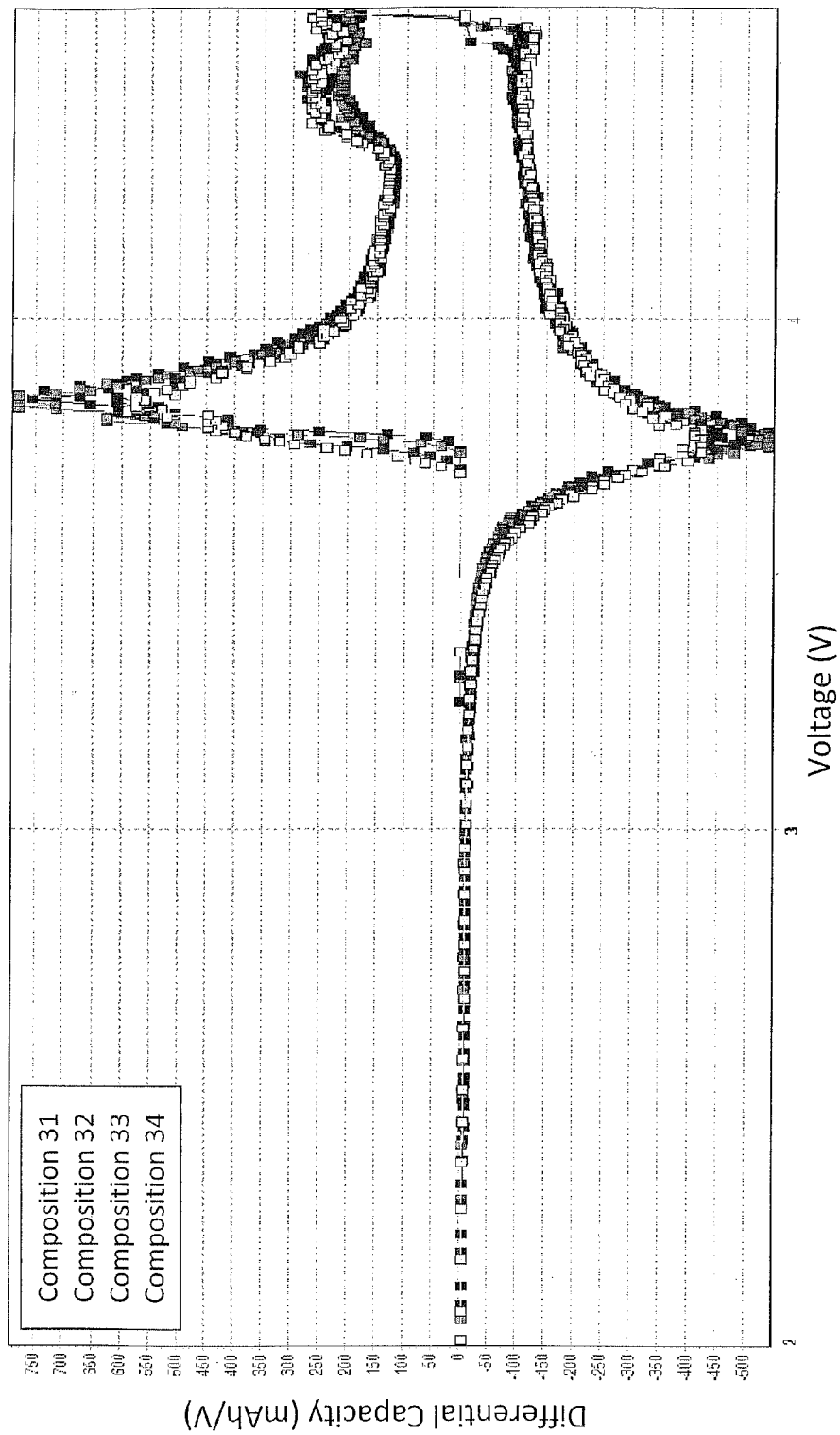
FIG. 10 is a graph with a set of plots of differential capacity as a function of cell voltage for a set of coin batteries formed with positive electrode active materials having X=0.1 for the first charge and discharge cycle with a charge to 4.6 volts and a discharge to 2.0 volts at a rate of C/10.
Figure 11:
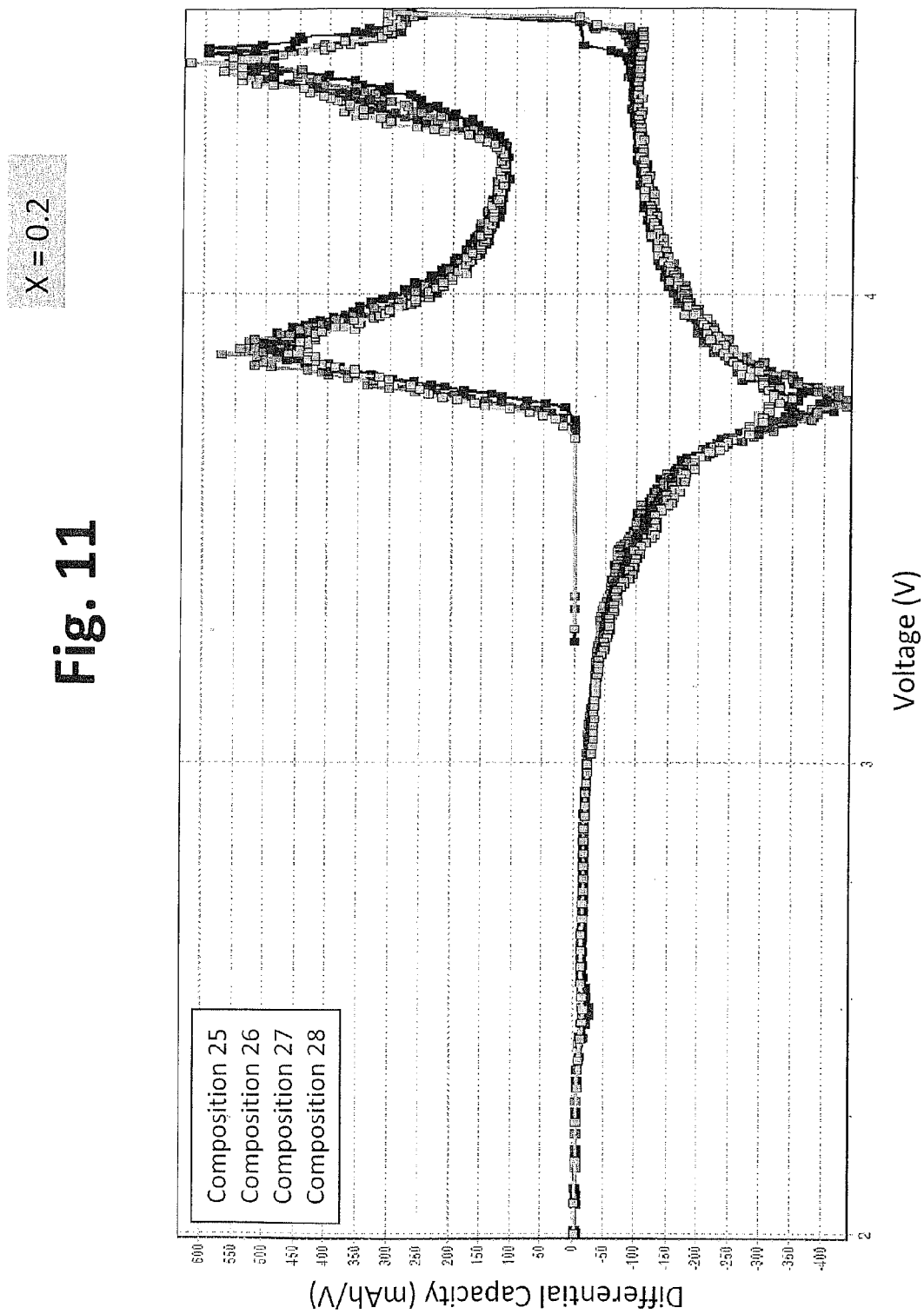
FIG. 11 is a graph with a set of plots of differential capacity as a function of cell voltage for a set of coin batteries formed with positive electrode active materials having X=0.2 for the first charge and discharge cycle with a charge to 4.6 volts and a discharge to 2.0 volts at a rate of C/10.
Figure 12:
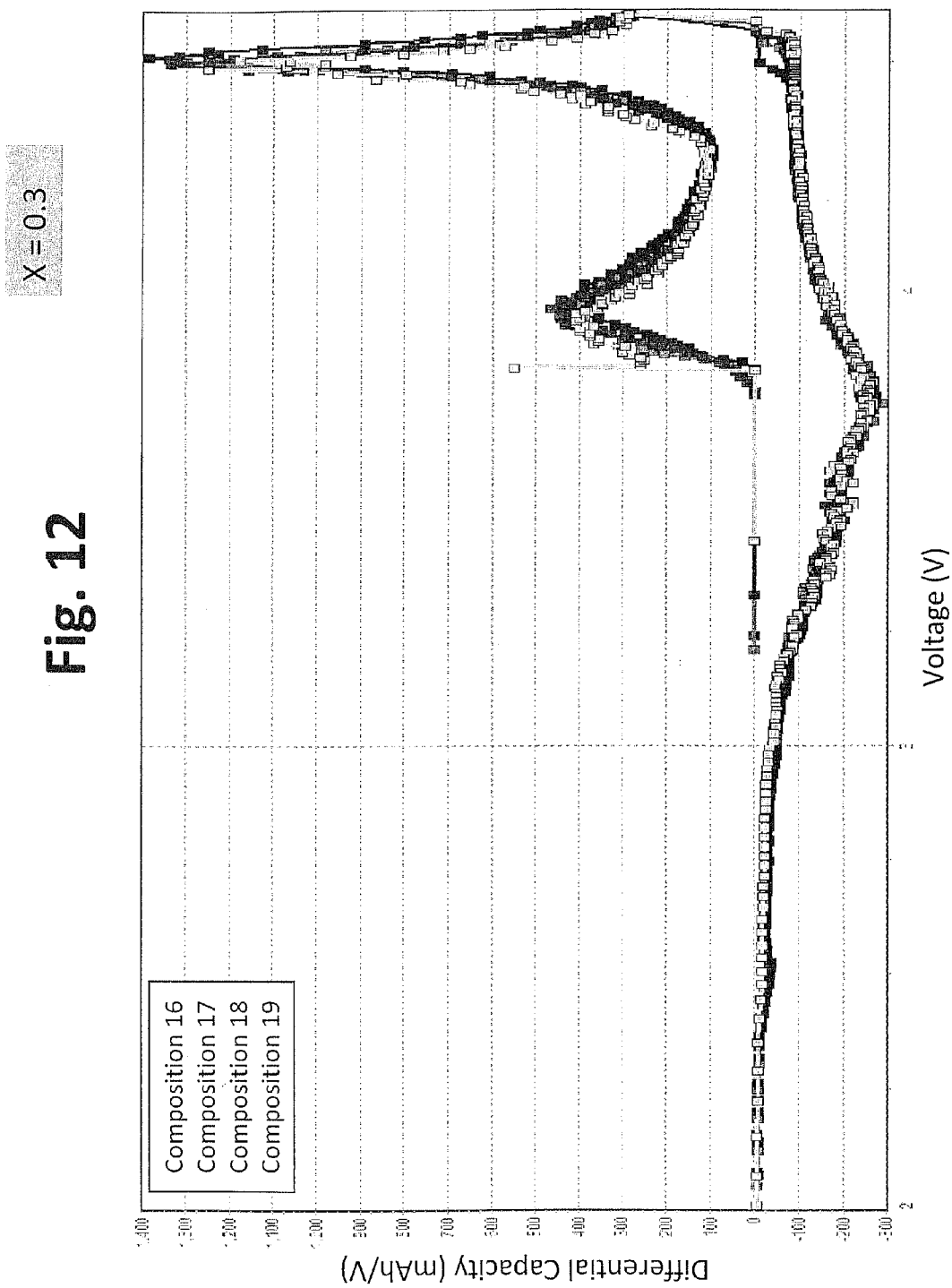
FIG. 12 is a graph with a set of plots of differential capacity as a function of cell voltage for a set of coin batteries formed with positive electrode active materials having X=0.3 for the first charge and discharge cycle with a charge to 4.6 volts and a discharge to 2.0 volts at a rate of C/10.
Figure 13:
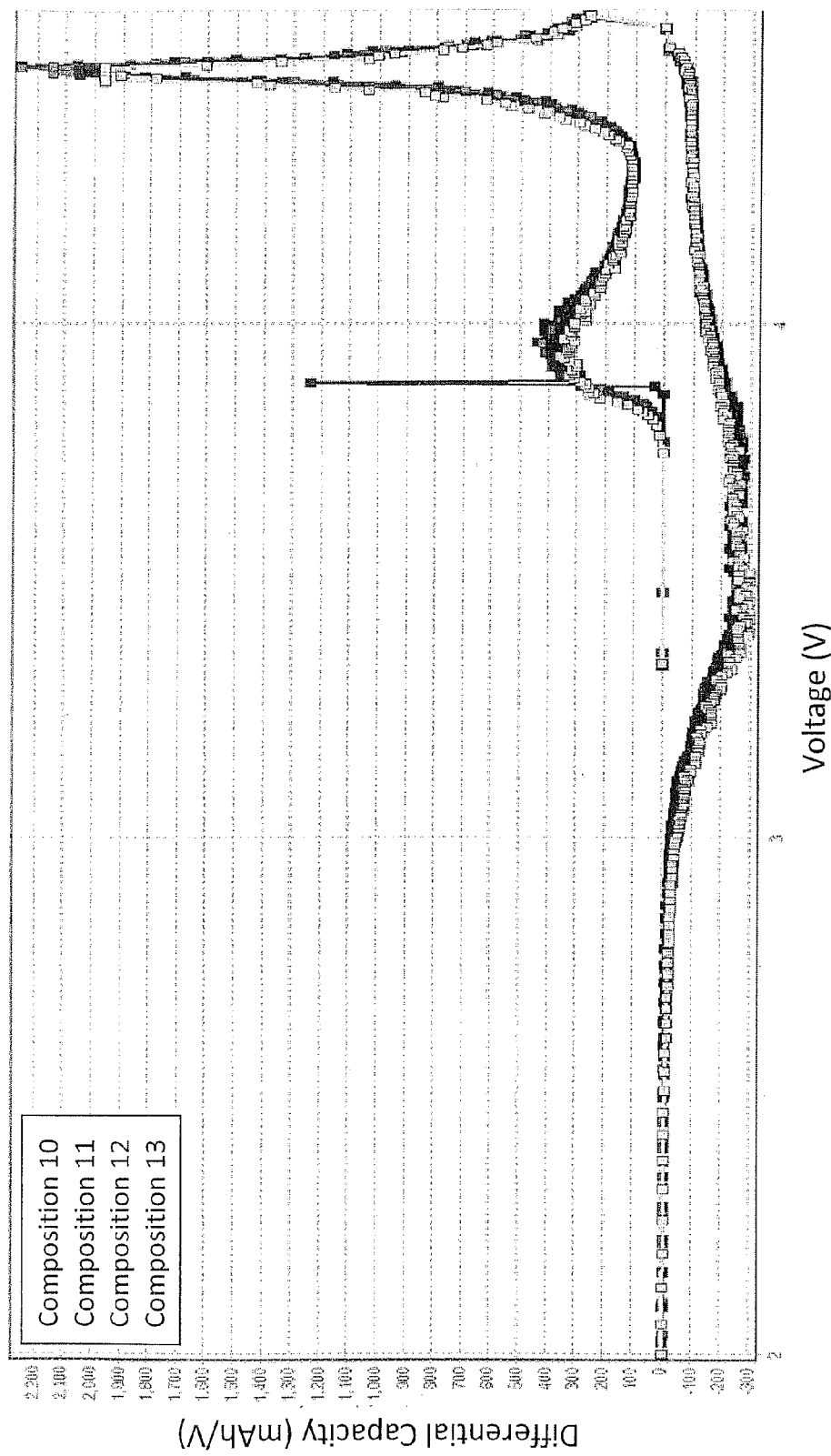
FIG. 13 is a graph with a set of plots of differential capacity as a function of cell voltage for a set of coin batteries formed with positive electrode active materials having X=0.4 for the first charge and discharge cycle with a charge to 4.6 volts and a discharge to 2.0 volts at a rate of C/10.

Coin cells were formed with positive electrodes incorporating powders synthesized as described in Examples 1 and 2. The coin cell batteries were tested for 24 charge and discharge cycles at discharge rates of C/10 for cycles 1-2, C/5 for cycles 3-4, C/3 for cycles 5-6, 1 C for cycles 7-11, 2 C for cycles 12-16, 5 C for cycles 17-21, and C/5 for cycles 22-24. Plots of specific discharge capacity versus cycle of the coin cell batteries are shown in FIGS. 4-9 along with the specific discharge capacity results for batteries with a second set of compositions described in Example 4 for comparison. Specifically, graphs shown in FIG. 4, FIG. 5, FIG. 6, FIG. 7, and FIG. 8 are directed to batteries with positive electrode active materials with approximate stoichiometries represented by the formula I with x=0.1, 0.2, 0.3, 0.4, and 0.5, respectively. And FIG. 9 is directed to materials with x=0.5 coated with 0.5 wt % MgO. Each figure consist of a set of plots with results for the variations of compositions having varying degrees of Mn %. In general, the specific discharge capacity increased with increasing values of x in the formula for the positive electrode active material, but the batteries with the positive electrode material with x=0.5 exhibited lower specific discharge capacities at higher rates relative to batteries with the x=0.4 and x=0.5 coated with 0.5 wt % MgO materials.

Figure 14:
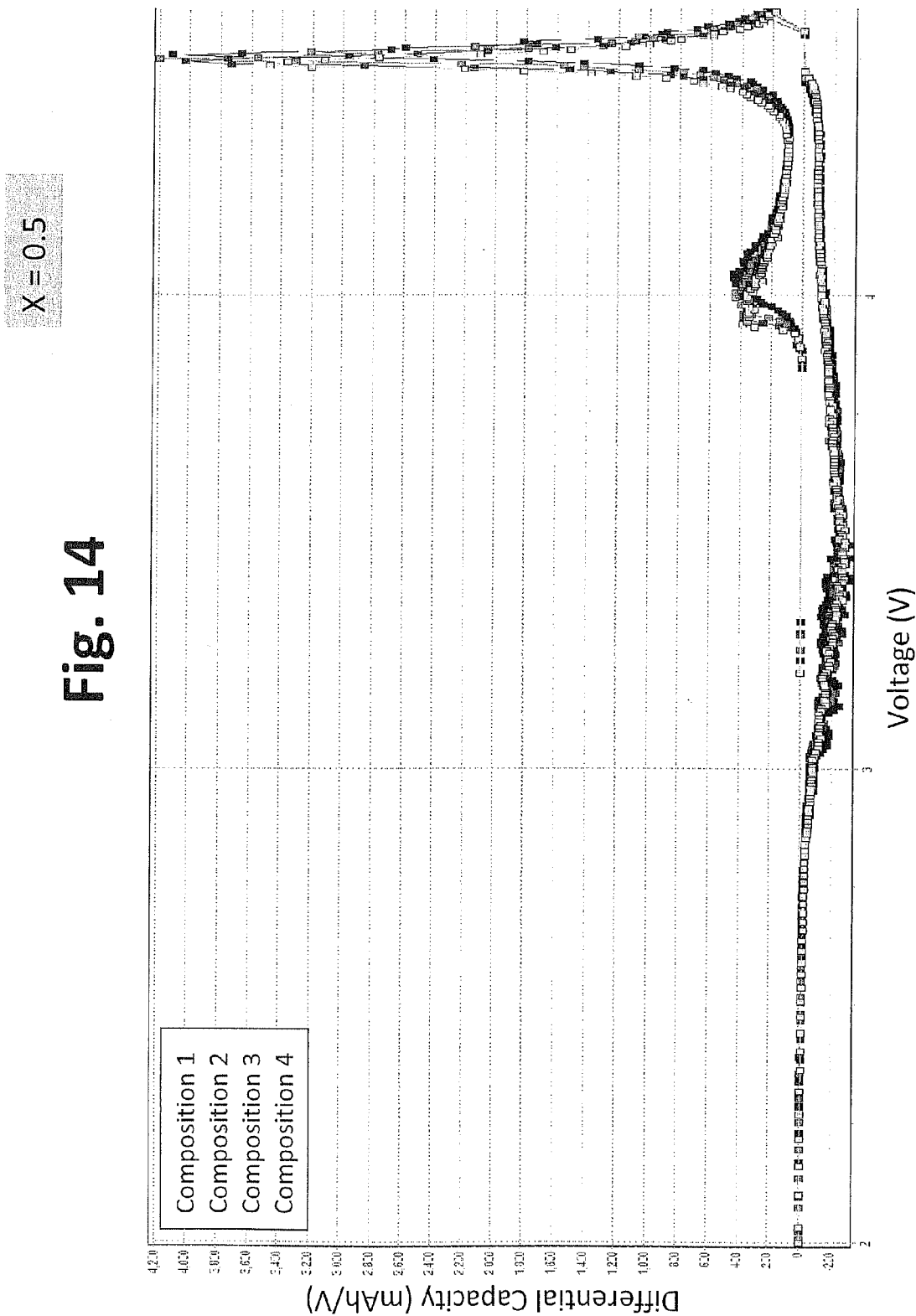
FIG. 14 is a graph with a set of plots of differential capacity as a function of cell voltage for a set of coin batteries formed with positive electrode active materials having X=0.5 for the first charge and discharge cycle with a charge to 4.6 volts and a discharge to 2.0 volts at a rate of C/10.

Plots of differential capacity (mAh/V) versus voltage (V) of the coin cell batteries are shown in FIGS. 10-14. Specifically, graphs shown in FIG. 10, FIG. 11, FIG. 12, FIG. 13, and FIG. 14 are directed to the differential capacities for batteries incorporating active materials approximately represented with formula I having x=0.1, 0.2, 0.3, 0.4, and 0.5 respectively. FIG. 14 also include data directed to composite material with x=0.5 coated with 0.5 wt % MgO. The charging process is plotted as a positive differential capacity, and the discharging process is plotted as a negative discharge capacity. For a particular value of x, the differential capacity results are qualitatively the same regardless of the amount of Mn %, although the differential capacity behavior is strongly dependent on the value of X. The discharge peak near 3.8-3.9 volts is believed to be related to the reaction of $LiMO_2$ component of formula I, while the peak near 4.4-4.5 volts is believed to be related to the reaction of the $Li_2MnO_3$ component of the composition. Thus, the peak near 3.8 volts diminishes and the peak near 4.4 volts increases as a function of increasing X.

Specific capacity at the first charge and discharge cycle, irreversible capacity loss and average voltage of the batteries are compared and the results are outlined in Tables 5-9 below. As noted above, the irreversible capacity loss is the difference between the first charge capacity and the first discharge capacity for the battery. The average voltage was obtained in the first discharge cycle for a discharge from 4.6V to 2V at a discharge rate of C/10. Specifically, data shown in Table 5, Table 6, Table 7, Table 8, and Table 9 are directed to battery performance with positive electrode active materials with x=0.1, 0.2, 0.3, 0.4, and 0.5 respectively. Each table includes a set of results for batteries corresponding to cathode compositions with varying percent of Mn for a given X and results from corresponding composite materials coated with 0.5 wt % MgO.

Figure 15:
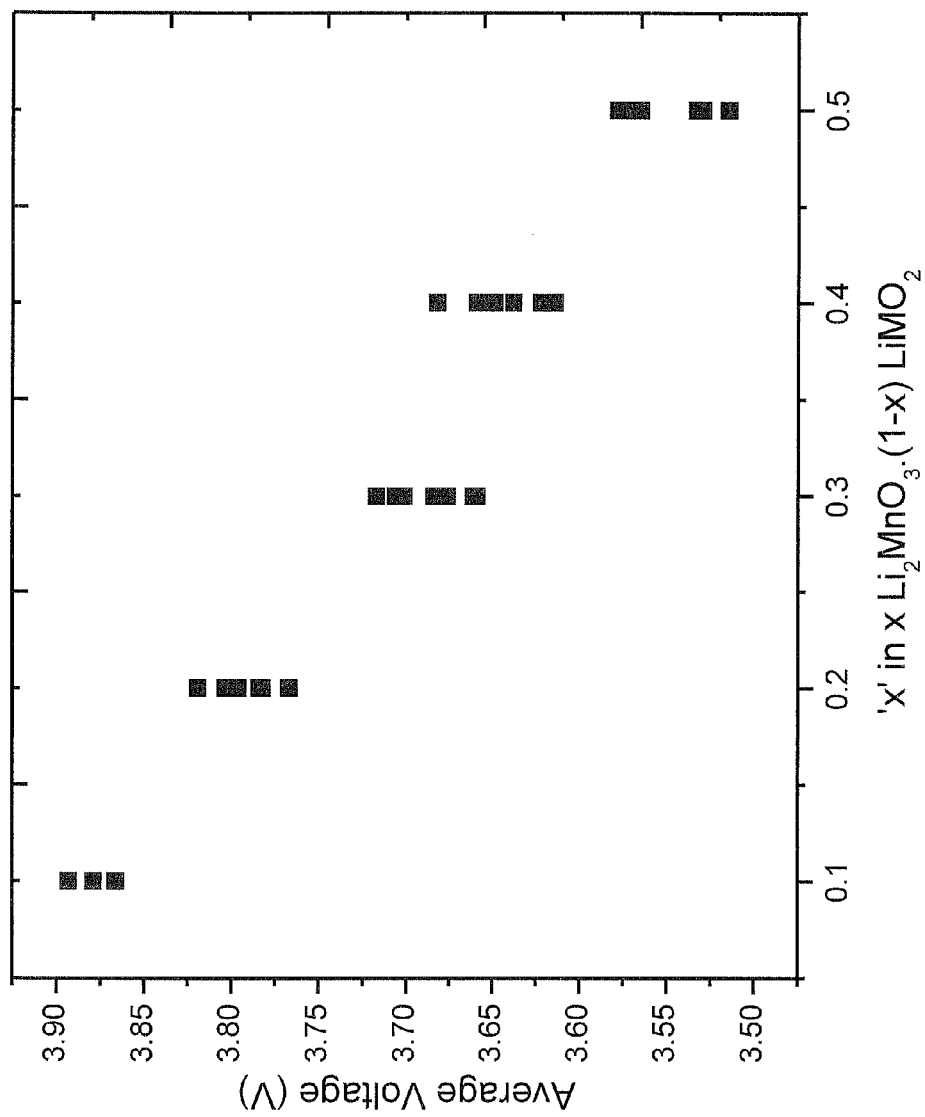
FIG. 15 is a plot of average voltage as a function of X in the composition of the positive electrode active material for coin batteries having a lithium metal negative electrode over the first discharge cycle from 4.6 volts to 2.0 volts.
Figure 16:
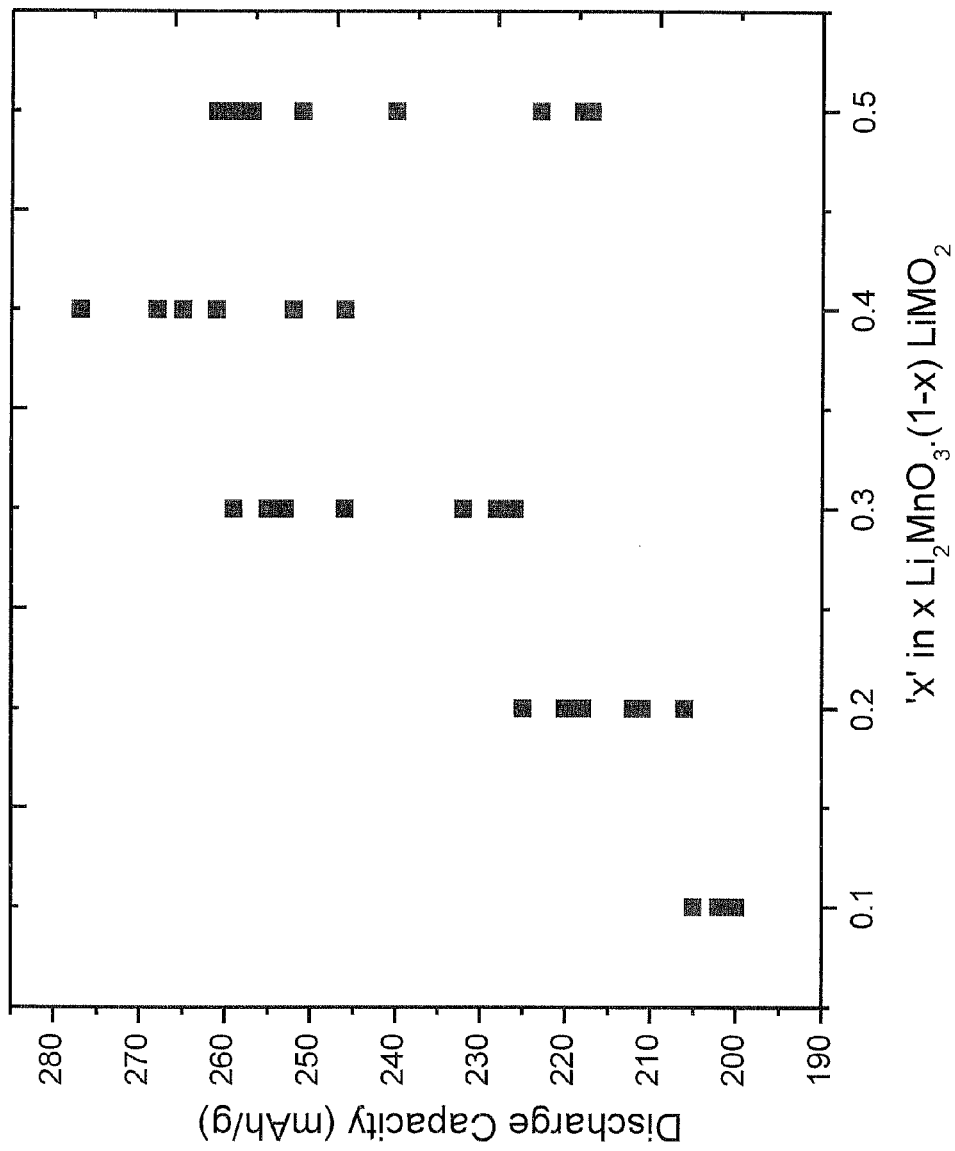
FIG. 16 is a plot of specific discharge capacity as a function of X in the composition of the positive electrode active material for coin batteries having a lithium metal negative electrode over the first discharge cycle from 4.6 volts to 2.0 volts.
Figure 17:
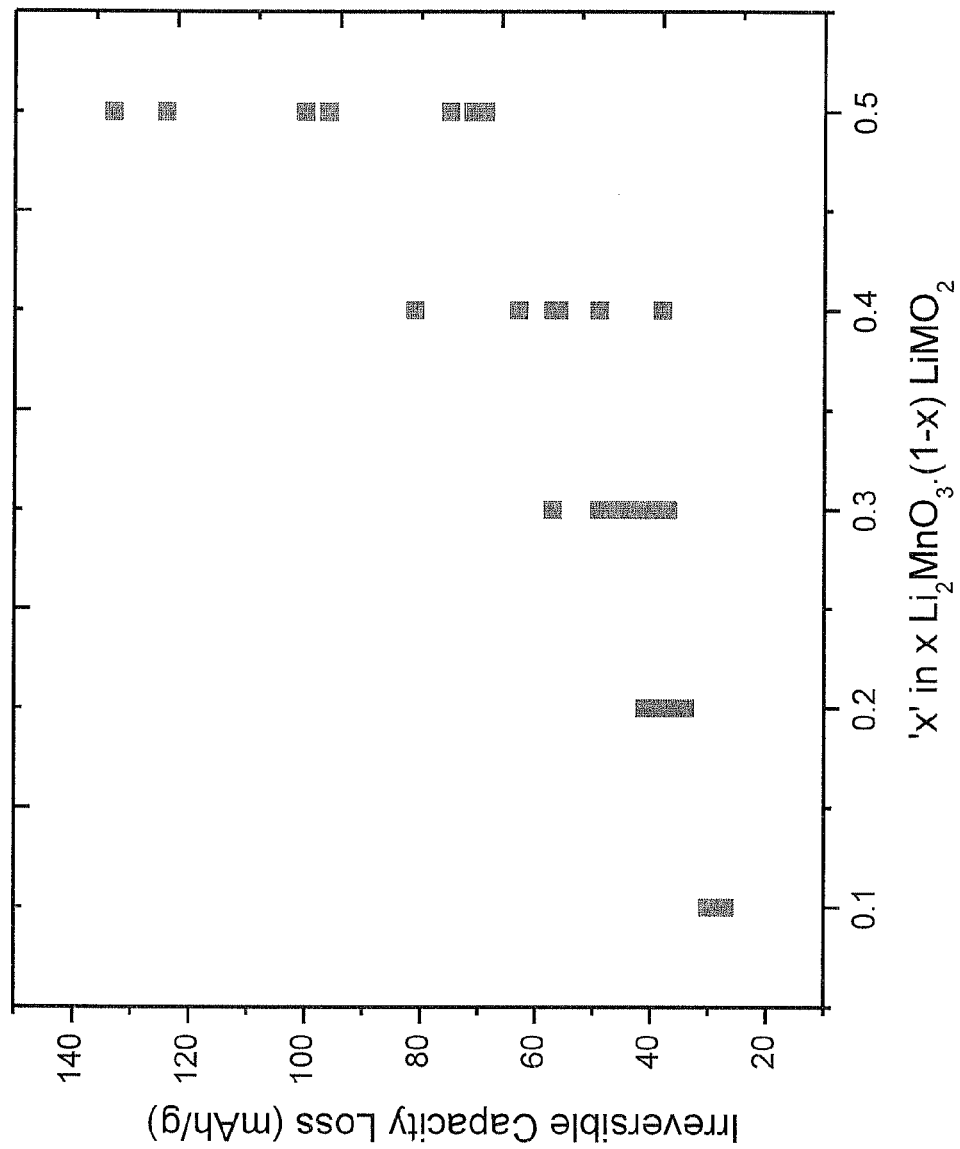
FIG. 17 is a plot of irreversible capacity loss as a function of X in the composition of positive electrode active material for coin batteries having a lithium metal negative electrode over the first discharge cycle from 4.6 volts to 2.0 volts.

The variations of average voltage for batteries having active compositions with different x values (0.1, 0.2, 0.3, 0.4, and 0.5) are plotted in FIG. 15. Specifically, average voltage decreased with increasing x values for the positive electrode active material. The variation of first cycle discharge capacity at a rate of 0.1 C for different x values (0.1, 0.2, 0.3, 0.4, and 0.5) are plotted in FIG. 16. Specifically, discharge capacity increased with increasing x values with 0.4 and 0.5 having comparable discharge capacities. The values of IRCL increased for increasing X values, as seen in FIG. 17. The increasing IRCL with increasing x values is consistent with the IRCL being mainly contributed by the reaction of $Li_2MnO_3$.

TABLE 5

| System | Specific Capacity (mAh/g) | | IRCL (mAh/g) | Average Voltage (V) |
|---|---|---|---|---|
| | Charge | Discharge | | |
| Composition 31 | 230 | 202 | 28 | 3.866 |
| Composition 31 Coated | 231 | 198 | 33 | 3.778 |
| Composition 32 | 227 | 200 | 27 | 3.893 |
| Composition 32 Coated | 237 | 207 | 30 | 3.884 |
| Composition 33 | 230 | 200 | 30 | 3.879 |
| Composition 33 Coated | 233 | 201 | 32 | 3.866 |

TABLE 5-continued

| System | Specific Capacity (mAh/g) Charge | Specific Capacity (mAh/g) Discharge | IRCL (mAh/g) | Average Voltage (V) |
|---|---|---|---|---|
| Composition 34 | 233 | 205 | 28 | 3.893 |
| Composition 34 Coated | 227 | 200 | 27 | 3.883 |

TABLE 6

| System | Specific Capacity (mAh/g) Charge | Specific Capacity (mAh/g) Discharge | IRCL (mAh/g) | Average Voltage (V) |
|---|---|---|---|---|
| Composition 25 | 249 | 211 | 38 | 3.782 |
| Composition 25 Coated | 252 | 210 | 42 | 3.773 |
| Composition 26 | 253 | 218 | 35 | 3.803 |
| Composition 26 Coated | 252 | 209 | 43 | 3.743 |
| Composition 27 | 247 | 212 | 35 | 3.784 |
| Composition 27 Coated | 259 | 218 | 41 | 3.783 |
| Composition 28 | 254 | 220 | 34 | 3.796 |
| Composition 28 Coated | 267 | 228 | 39 | 3.776 |
| Composition 29 | 242 | 206 | 36 | 3.819 |
| Composition 30 | 266 | 225 | 41 | 3.767 |

TABLE 7

| System | Specific Capacity (mAh/g) Charge | Specific Capacity (mAh/g) Discharge | IRCL (mAh/g) | Average Voltage (V) |
|---|---|---|---|---|
| Composition 16 | 281 | 232 | 49 | 3.659 |
| Composition 16 coated | 288 | 232 | 56 | 3.676 |
| Composition 17 | 273 | 226 | 47 | 3.678 |
| Composition 17 coated | 292 | 235 | 57 | 3.7 |
| Composition 18 | 272 | 228 | 44 | 3.681 |
| Composition 18 coated | 292 | 236 | 56 | 3.704 |
| Composition 19 | 271 | 228 | 43 | 3.717 |
| Composition 19 coated | 291 | 238 | 53 | 3.718 |
| Composition 20 | 292 | 255 | 37 | 3.706 |
| Composition 21 | 294 | 254 | 40 | 3.701 |
| Composition 22 | 299 | 259 | 40 | 3.684 |
| Composition 23 | 298 | 253 | 45 | 3.676 |
| Composition 24 | 302 | 246 | 57 | 3.661 |

TABLE 8

| System | Specific Capacity (mAh/g) Charge | Specific Capacity (mAh/g) Discharge | IRCL (mAh/g) | Average Voltage (V) |
|---|---|---|---|---|
| Composition 10 | 315 | 252 | 63 | 3.682 |
| Composition 10 Coated | 318 | 255 | 63 | 3.666 |
| Composition 11 | 322 | 265 | 57 | 3.649 |
| Composition 11 Coated | 323 | 264 | 59 | 3.636 |
| Composition 12 | 317 | 261 | 56 | 3.659 |
| Composition 12 Coated | 323 | 264 | 59 | 3.644 |
| Composition 13 | 317 | 268 | 49 | 3.638 |

TABLE 8-continued

| System | Specific Capacity (mAh/g) Charge | Specific Capacity (mAh/g) Discharge | IRCL (mAh/g) | Average Voltage (V) |
|---|---|---|---|---|
| Composition 13 Coated | 322 | 268 | 54 | 3.635 |
| Composition 14 | 315 | 277 | 38 | 3.622 |
| Composition 15 | 326 | 246 | 81 | 3.614 |

TABLE 9

| System | Specific Capacity (mAh/g) Charge | Specific Capacity (mAh/g) Discharge | IRCL (mAh/g) | Average Voltage (V) |
|---|---|---|---|---|
| Composition 1 | 327 | 258 | 69 | 3.578 |
| Composition 1 coated | 331 | 260 | 71 | 3.595 |
| Composition 2 | 331 | 261 | 70 | 3.576 |
| Composition 2 coated | 340 | 270 | 70 | 3.586 |
| Composition 3 | 332 | 257 | 75 | 3.575 |
| Composition 3 coated | 340 | 267 | 73 | 3.59 |
| Composition 4 | 331 | 260 | 71 | 3.565 |
| Composition 4 coated | 328 | 258 | 70 | 3.586 |
| Composition 5 | 339 | 239 | 100 | 3.533 |
| Composition 6 | 345 | 249 | 96 | 3.567 |
| Composition 7 | 345 | 223 | 123 | 3.5294 |
| Composition 8 | 356 | 218 | 133 | 3.533 |
| Composition 9 | 351 | 217 | 133 | 3.5145 |

Figure 18:
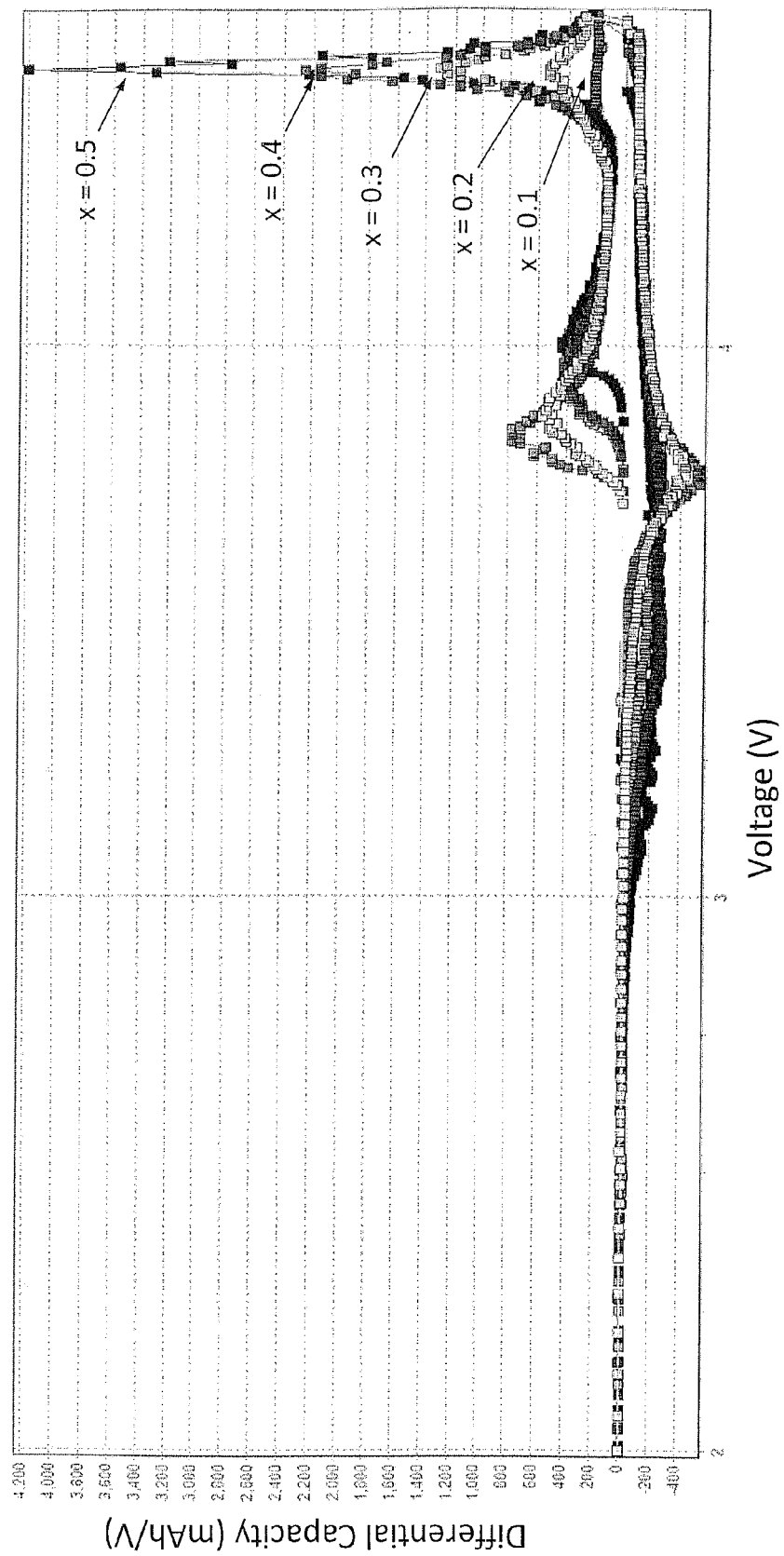
FIG. 18 is a graph with a set of plots of differential capacity as a function of cell voltage for a set of coin batteries formed with positive electrode active materials having a value of X=0.1, 0.2, 0.3, 0.4 and 0.5 for the first charge and discharge cycle with a charge to 4.6 volts and a discharge to 2.0 volts at a rate of C/10.

Differential capacity (mAh/V) versus voltage (V) of the coin cell batteries with different values of X are compared in FIG. 18. The differential capacity curves shown in FIG. 18 show a peak at about 4.4 volts decreasing in magnitude for the lower X compositions. However, the peak near 3.8-4.0 volts increases in magnitude and shifts with respect to voltage for lower X compositions.

Example 4

Battery Performance—Second Set of Compositions

This example demonstrates the battery performance of coin cells formed with the lithium metal oxides with the set of compositions from Example 1, with or without magnesium oxide coatings as specified in Example 2 above.

Figure 19:
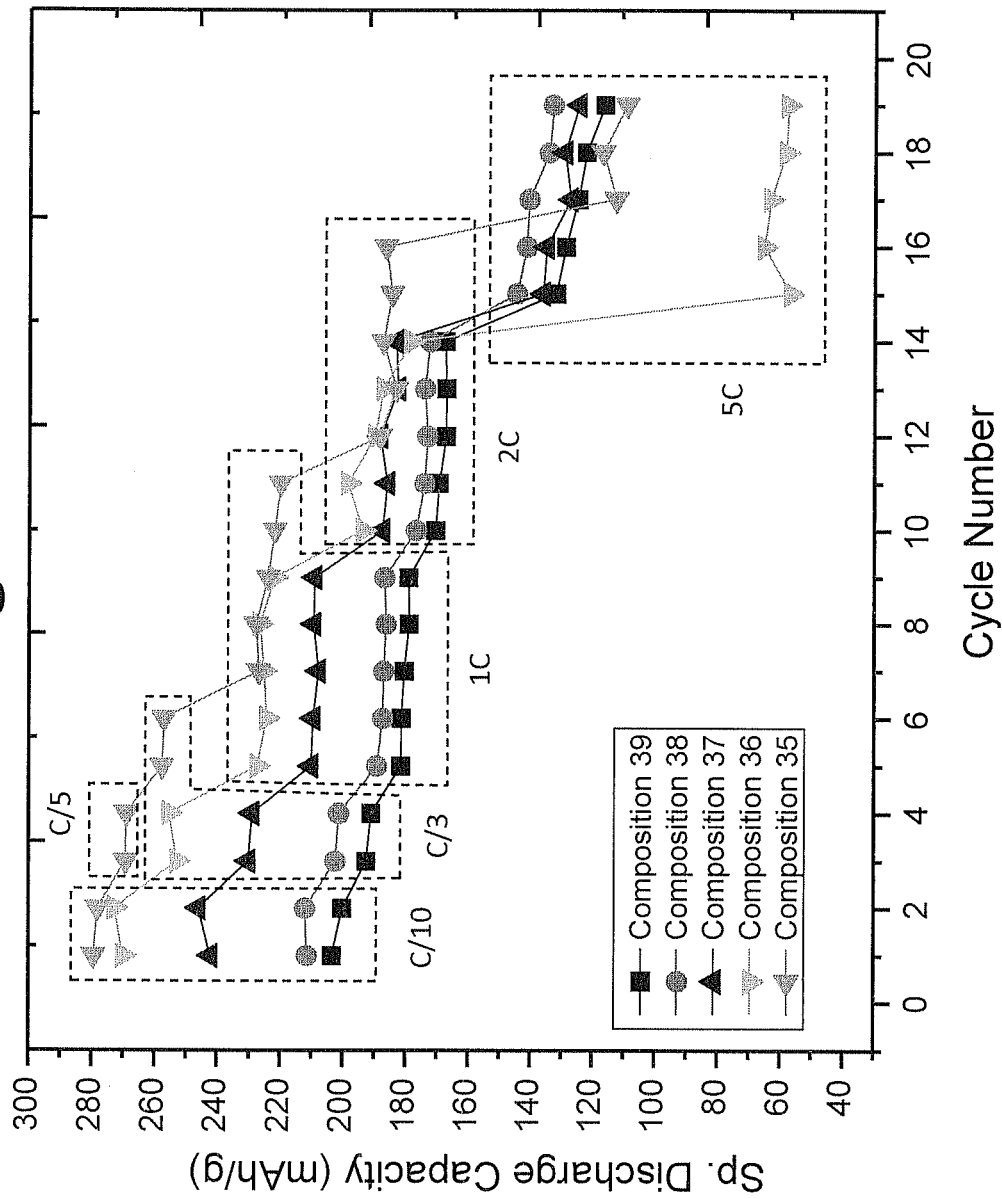
FIG. 19 is a plot of specific discharge capacity versus cycle number of a set of lithium rich metal oxides with alternative sets of compositions having values of X=0.1, 0.2, 0.3, 0.4 and 0.5 cycled at 0.1 C for the first two cycles, 0.33 C for cycle numbers 3 and 4, 1 C for cycle numbers 5 and 9, 2 C for cycle numbers 10-14, and 5 C for cycle numbers 15-19. Composition #35 has an extra two C/5 cycles in comparison to the other compositions.

Coin cells were formed with positive electrodes incorporating powders synthesized as described in Examples 1 and 2. The coin cell batteries were tested for 19 charge and discharge cycles at discharge rates of C/10 for cycles 1-2, C/3 for cycles 3-4, 1 C for cycles 5-9, 2 C for cycles 10-14, and 5 C for cycles 15-19. The battery with composition 35 had an extra two C/5 cycles in comparison with the batteries with the other compositions. Plots of specific discharge capacity versus cycle number of the coin cell batteries incorporating active materials approximately represented with formula I having x=0.1, 0.2, 0.3, 0.4 and 0.5 are shown in FIG. 19. In general, the specific discharge capacity increased with increasing values of x in the formula for the positive electrode active material, but the batteries with the positive electrode material with x=0.4 exhibited lower specific discharge capacities at higher rates relative to batteries with the x=0.1, 0.2, and 0.3.

Figure 20:
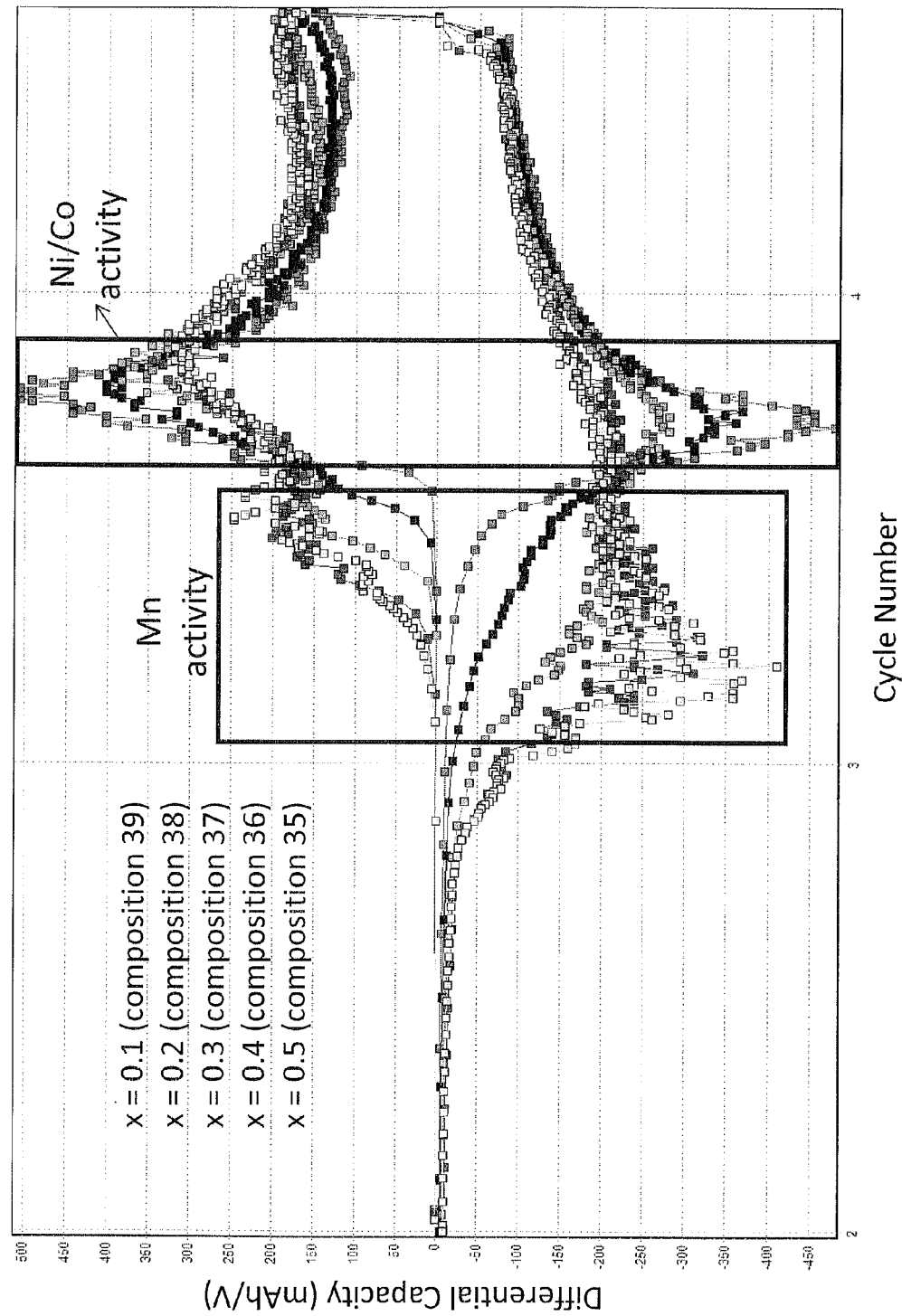
FIG. 20 is a plot of differential capacity as a function of cell voltage for a set of coin batteries formed with an alternative set of positive electrode active materials having X=0.1, 0.2, 0.3, 0.4 and 0.5 for the second charge and discharge cycle with a charge to 4.6 volts and a discharge to 2.0 volts at a rate of C/10.

Plots of differential capacity (mAh/V) versus voltage (V) of the coin cell batteries incorporating active materials approximately represented with formula I having x=0.1, 0.2, 0.3, 0.4 and 0.5 are shown in FIG. 20 for charge and discharge cycle 2. The charging process is plotted as a positive differential capacity, and the discharging process is plotted as a negative discharge capacity. The discharge peak near 3.8-3.9 volts is believed to be related to the reaction of $LiMO_2$ component of formula I, while the peak near 3.0 volts is believed to be related to the reaction of the $Li_2MnO_3$ component of the composition. Thus, the peak near 3.8 volts diminishes and the peak near 3.0 volts increases as a function of increasing X.

Specific capacity at the first charge and discharge cycle, irreversible capacity loss and average voltage of the batteries incorporating positive electrode active materials with x=0.1, 0.2, 0.3, 0.4 and 0.5 are compared and the results are outlined in Table 10 below. As noted above, the irreversible capacity loss is the difference between the first charge capacity and the first discharge capacity for the battery. The average voltage was obtained in the first discharge cycle for a discharge from 4.6V to 2V at a discharge rate of C/10.

TABLE 10

| x in $x LiMn_2O_3 \cdot (1-x)LiMO_2$ | $1^{st}$ Charge Capacity (mAh/g) | $1^{st}$ Discharge Capacity (mAh/g) | Irreversible loss (mAh/g) | Avg. Voltage (V) |
|---|---|---|---|---|
| 0.1 | 235 | 203 | 32 | 3.867 |
| 0.2 | 259 | 214 | 45 | 3.810 |
| 0.3 | 294 | 245 | 49 | 3.711 |
| 0.4 | 316 | 270 | 46 | 3.606 |
| 0.5 | 330 | 268 | 58 | 3.6 |

Example 5

Formation of $AlF_3$ Coated Lithium Metal Oxide Materials

The lithium metal oxide particles prepared in the example 1 were coated with a thin layer of aluminum fluoride ($AlF_3$) using a solution-based method. For a selected amount of aluminum fluoride coating, an appropriate amount of saturated solution of aluminum nitrate was prepared in an aqueous solvent. The lithium metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the $AlF_3$ coated lithium metal oxide material.

Samples of lithium metal oxide (LMO) particles synthesized as described in example 1 were coated with various selected amounts of aluminum fluoride using the process described in this example. Transmission electron microscopy was used to assess the thickness of the resulting $AlF_3$ coatings. The aluminum fluoride coated LMOs were then used to form coin cell batteries following the procedure outlined above. The coin cell batteries were tested as described in the following Example 6.

Example 6

Battery Performance for $AlF_3$ Coated Samples

This example demonstrates how the battery performance varied with respect to different lithium metal oxide compositions for a range of $AlF_3$ coating thicknesses and for various battery performance parameters.

Figure 21:
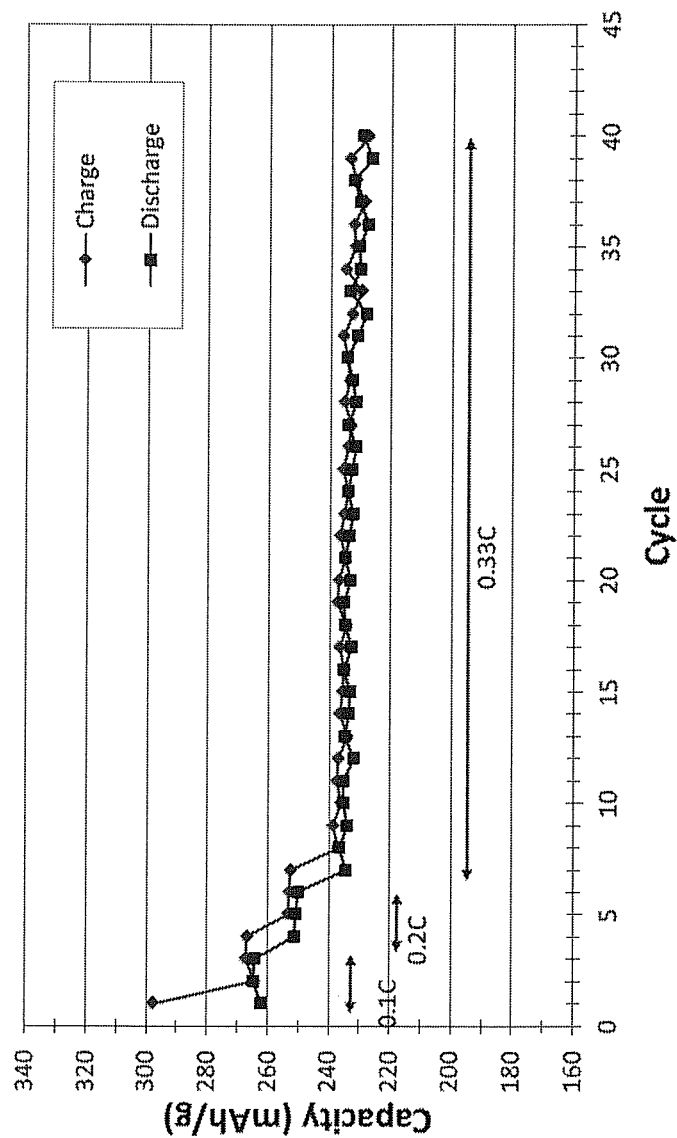
FIG. 21 is a plot of specific charge and discharge capacity as a function of cycle for a coin battery formed with a positive electrode active material with X=0.5 and having an $AlF_3$ coating for a cell discharged from 4.6 volts to 2.0 volts with a rate of 0.1 C for cycles 1 and 2, 0.2 C for cycles 3 and 4 and 0.33 C for cycles 5 to 40.

Coin cell batteries were formed from the materials synthesized as described above. The cells were cycled to evaluate their performance. The first three cycles were measured at a charge/discharge rate of 0.1 C. The next three cycles were measured at a charge/discharge rate of 0.2 C. The subsequent cycles were measured at a charge/discharge rate of 0.33 C. Specific capacity versus cycle of the coin cell battery are shown in FIG. 21. The battery maintained approximately 98% specific capacity after going through 40 charge and discharge cycles relative to the 7th cycle specific capacity.

Figure 22:
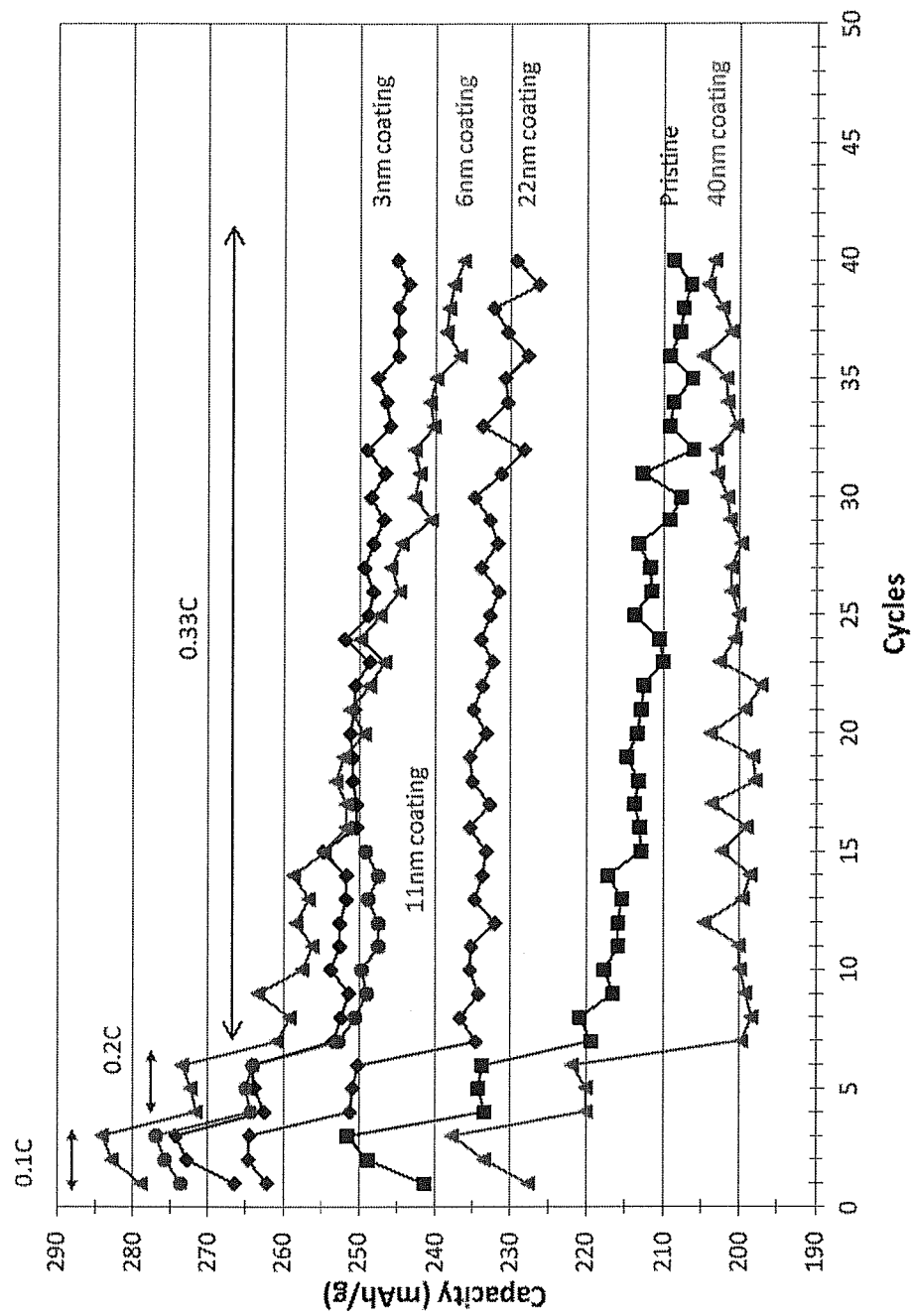
FIG. 22 is a graph with a set of plot of specific discharge capacity as a function of cycle for a coin battery formed with a positive electrode active material with X=0.5 and having various $AlF_3$ coating thicknesses for a cell discharged from 4.6 volts to 2.0 volts with a rate of 0.1 C for cycles 1 and 2, 0.2 C for cycles 3 and 4 and 0.33 C for cycles 5 to 40.

Specific capacity versus cycle of the coin cell batteries formed from uncoated, 3 nm, 6 nm, 11 nm, 22 nm, and 40 nm aluminum fluoride coated LMO materials were tested and the results are shown in FIG. 22. Batteries with the coated LMO materials showed a complex relationship between specific capacity performances as a function of the coating thickness. Batteries with LMO materials having a 6 nm aluminum fluoride coating had the highest specific capacity at low cycle number, while batteries with LMO materials having a 4 nm aluminum fluoride coating had the highest capacity at 40 cycles. Battery with LMO materials having 40 nm coating had the lowest specific capacity, which was lower than the battery with the uncoated material, but this battery exhibited a slight increase in capacity with cycling.

Figure 23:
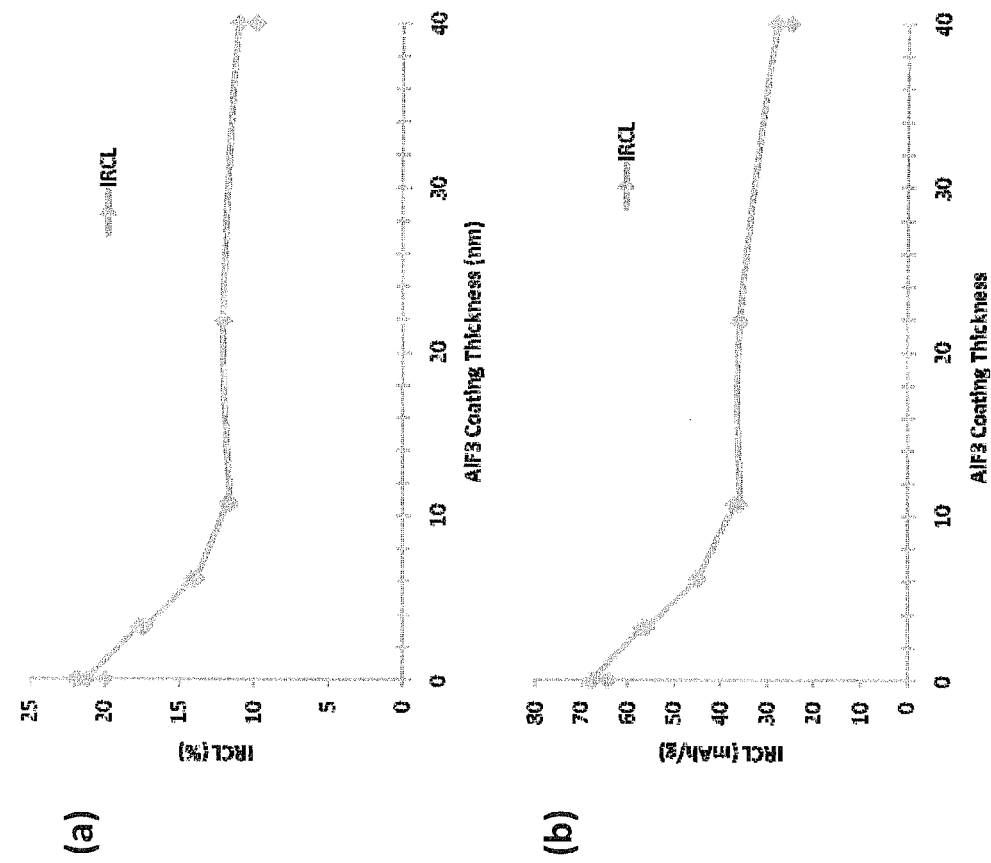
FIG. 23(a) is a plot of the irreversible capacity loss expressed as a percent of the initial charge specific capacity as a function of $AlF_3$ coating thickness for coin battery formed with a positive electrode active material with X=0.5.
FIG. 23(b) is a plot of the irreversible capacity loss expressed in units of mAh/g as a function of $AlF_3$ coating thickness for coin battery formed with a positive electrode active material with X=0.5.

The first cycle irreversible capacity loss (IRCL) of the batteries having uncoated, 3 nm, 6 nm, 11 nm, 22 ma, and 40 nm aluminum fluoride coated LMO materials were measured. A plot of the results in percentage of overall capacity versus coating thickness is shown in FIG. 23$a$ and a plot of the results in specific capacity change as a function of coating thickness is shown in FIG. 23$b$. The IRCL results showed a steady decrease of the IRCL for batteries with coating thicknesses of about 10 nm, and the IRCL roughly leveled off with for batteries having 11 nm, 22 nm, and 40 nm aluminum fluoride coated LMO materials.

Figure 24:
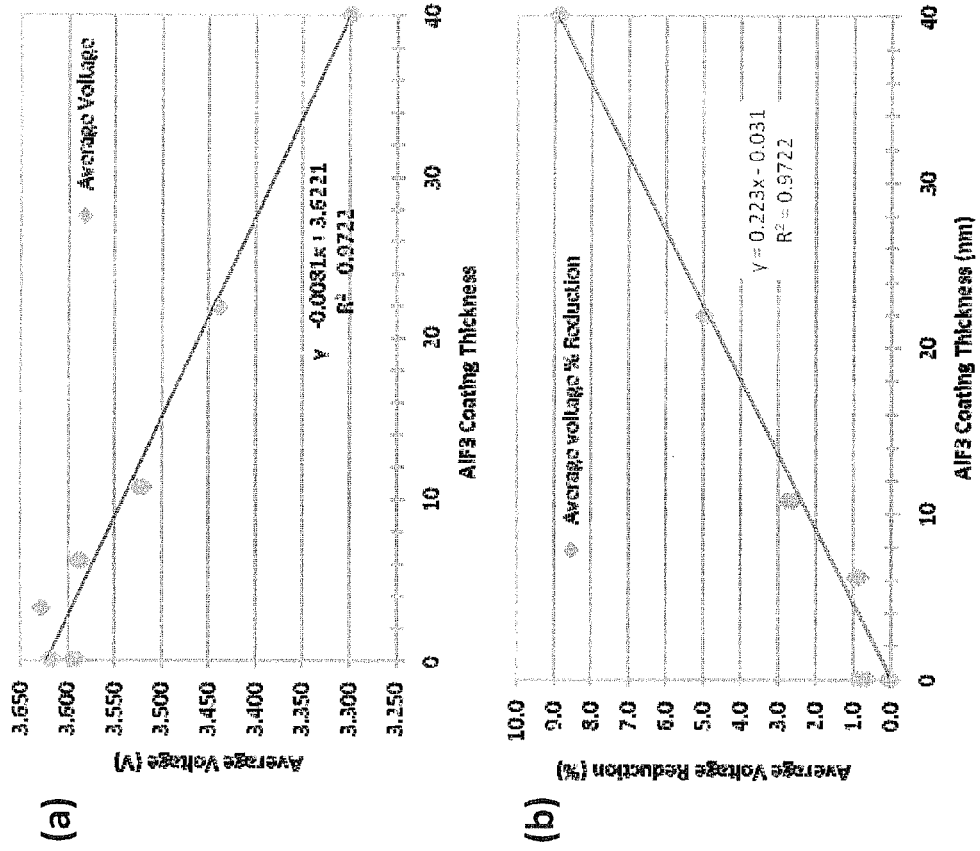
FIG. 24(a) is a plot of average voltage as a function of $AlF_3$ coating thickness for coin battery formed with a positive electrode active material with X=0.5.
FIG. 24(b) is a plot of percent average voltage reduction resulting form the presence of the coating as a function of $AlF_3$ coating thickness for coin battery formed with a positive electrode active material with X=0.5.

The average voltages of the batteries were measured for batteries having positive electrodes with uncoated, 3 nm, 6 nm, 11 nm, 22 nm, and 40 nm aluminum fluoride coated LMO materials. The average voltage was taken over a discharge from 4.6V to 2.0V. A plot of average voltage as a function of coating thickness is shown in FIG. 24$a$, and a plot of percentage of voltage reduction relative to the uncoated material performance versus coating thickness is shown in FIG. 24$b$. The average voltage generally showed a decrease versus increased aluminum fluoride coating thickness on the LMO materials, although the decrease in average voltage was small for coatings of 6 nm or less.

Figure 25:
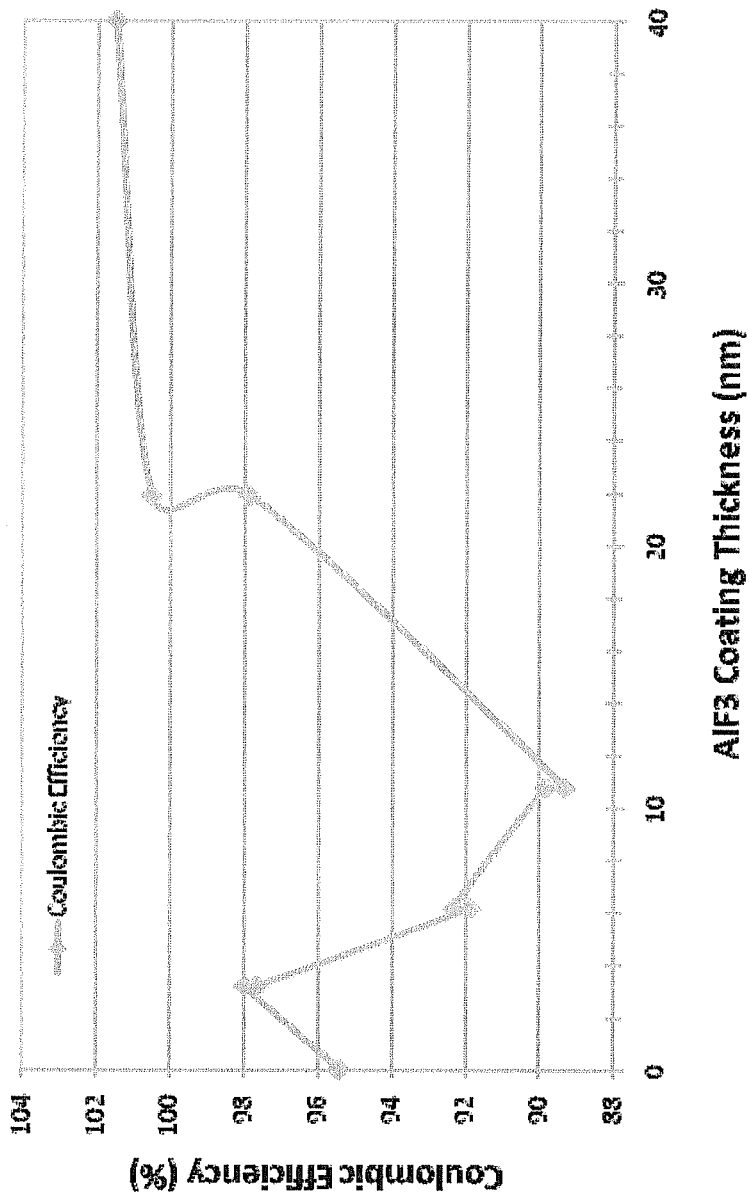
FIG. 25 is a plot of percent coulombic efficiency as a function of $AlF_3$ coating thickness for coin batteries formed with positive electrode material with X=0.5.

Additionally, the coulombic efficiency of the batteries having uncoated, 3 nm, 6 nm, 11 nm, 22 nm, and 40 nm aluminum fluoride coated LMO materials were measured. As used here, the coulombic efficiency is evaluated as the specific capacity at cycle 40 as a percentage of the specific capacity at cycle 7, the first cycle at a rate of C/3. In other words, the coulombic efficiency is 100×(specific capacity at cycle 40)/(specific capacity at cycle 7). A plot of the coulombic efficiency as a function of coating thickness is shown in FIG. 25. The coulombic efficiency increased by about 2% when coating thickness is increased from zero to 3 nm The coulombic efficiency then decreased significantly when coating thickness is increased from 3 nm to 6 nm and 11 nm The coulombic efficiency increased dramatically for batteries formed with positive electrode active materials when the coating thickness was 22 nm and 40 nm.

Example 7

Performance Results with Pouch Batteries

This example provides results based on pouch batteries with roughly 20 Ah total capacity with representative lithium rich active compositions synthesized as described in Example 1.

The lithium metal oxide (LMO) powders were synthesized as described in Example 1. Representative powders with $X=0.2, 0.3, 0.4$ and $0.5$ were used to form pouch batteries. The LMO powder was mixed thoroughly with acetylene black (Super P™ from Timcal, Ltd, Switzerland) and graphite (KS 6™ from Timcal, Ltd) to form a homogeneous powder mixture. Separately, Polyvinylidene fluoride (PVDF) (KF1300™ from Kureha Corp., Japan) was mixed with N-methyl-pyrrolidone (NMP) (Honeywell—Riedel-de-Haen) and stirred overnight to form a PVDF-NMP solution. The homogeneous powder mixture was then added to the PVDF-NMP solution and mixed to form homogeneous slurry. The slurry was applied onto an aluminum foil current collector to form a thin wet film using a blade coating process.

A positive electrode structure was formed by drying the aluminum foil current collector with the thin wet film in vacuum oven to remove NMP. The positive electrode and the foil current collector were pressed together between rollers of a sheet mill to obtain a positive electrode structure with desired thickness. The average thickness with the foil for the cathodes was roughly 110 microns.

A blend of graphite and binder was used as the anode (negative electrode), and the negative electrode composition was coated onto a copper foil current collector. The polymer binder was a blend of styrene-butadiene rubber (SBR) and carboxymethyl cellulose. The foil and anode paste were pressed together between rollers of a sheet mill. The completed anodes had a total thickness with the foil of roughly 115 microns.

The battery was constructed with 24 anode plates alternating with 23 cathode plates such that an anode plate is positioned at both ends of the stack. A trilayer (polypropylene/polyethylene/polypropylene) micro-porous separator (2320 from Celgard, LLC, NC, USA) soaked with electrolyte was placed between adjacent anodes and cathodes. The electrolyte was selected to be stable at high voltages, and appropriate electrolytes are described in copending U.S. patent application Ser. No. 12/630,992, now published 2011/0136019 to Amiruddin et al., entitled "Lithium Ion Battery With High Voltage Electrolytes and Additives," incorporated herein by reference. The electrode stack was then assembled into a conventional pouch cell structure. The resulting pouch battery had dimensions of 203 mm×93 mm×7.1 mm The battery had a room temperature discharge capacity of 15.3 Ah at a discharge rate of C/3. The formation of pouch cells using lithium rich positive electrode active compositions is described further in copending provisional U.S. patent application Ser. No. 61/369,825 to Kumar et al., entitled "Battery Packs for Vehicles and High Capacity Pouch Secondary Batteries for Incorporation into Compact Battery Packs," incorporated herein by reference.

Figure 26:
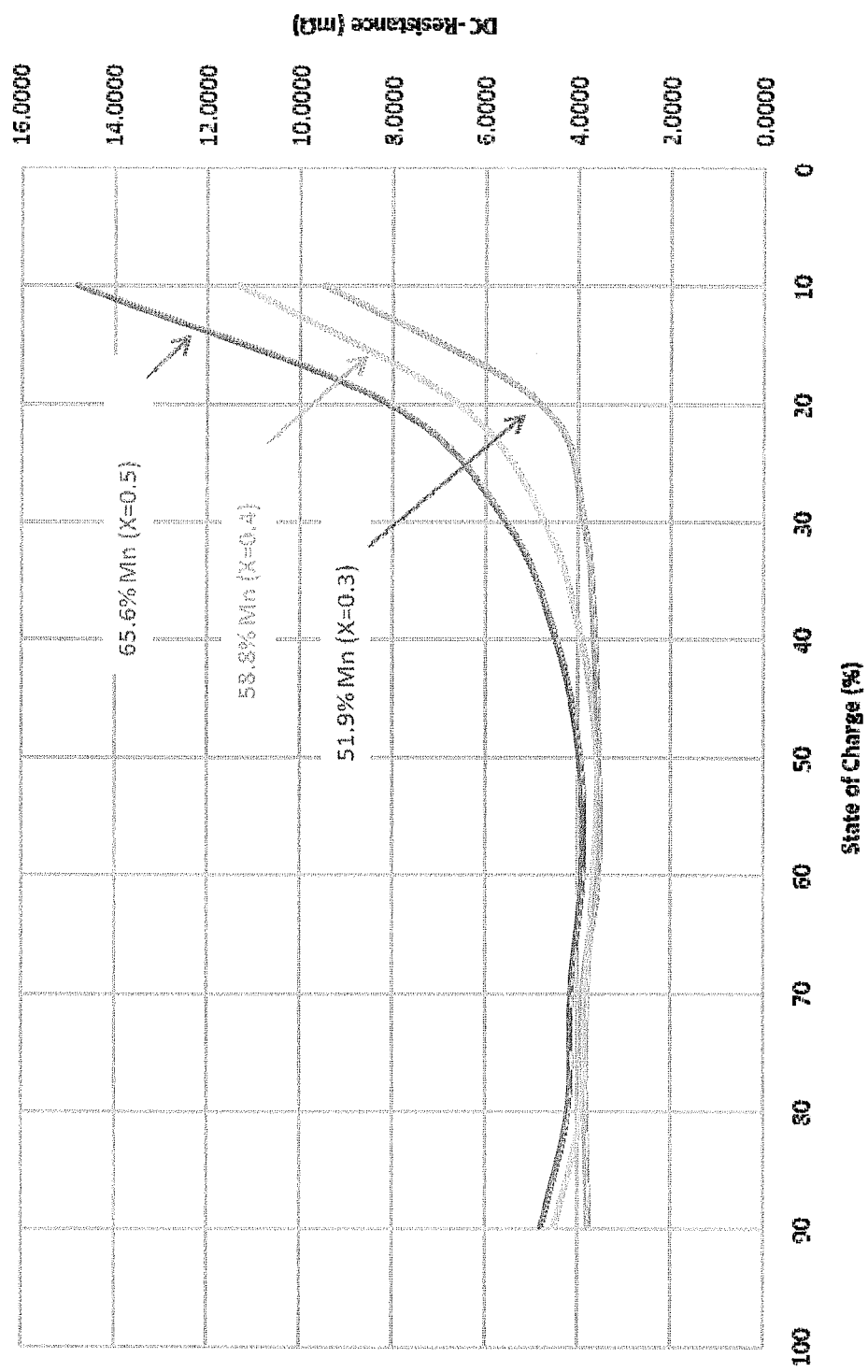
FIG. 26 is a graph with three plots of DC electrical resistance as a function of the battery state of charge for pouch cell batteries formed with graphitic carbon as the negative electrode active material and a lithium rich positive electrode active material with X=0.3, 0.4 and 0.5.

The DC-resistance was measured for the pouch batteries as a function of the state of charge for representative cathode compositions with $X=0.3$, $X=0.4$ and $X=0.5$. To perform further pulse testing, the battery is charged to 4.5V and then subjected to 1 C Pulse Test at room temperature (23° C.) with 10 second pulses. In the pulse test, the DC resistance was evaluated as a function of the state of charge starting from an initial 90% state of charge. The DC-resistance data is shown in FIG. 26.

While desirable values of DC-resistance below about 6 milliohms ($m\Omega$) are obtained with all of the batteries for greater states of charge, the resistance increases as the state of charge decreases. However, the DC-resistance increases more slowly as a function of the state of charge for positive electrode compositions with lower values of X. Thus, batteries formed with compositions with lower values of X can be discharged in commercial applications down to lower values of charge with desired low values of resistance before recharging the battery. The resistance was less than about 5 milliOhms ($m\Omega$) for a state of charge greater than about 35% for all three batteries and less than about 10 $m\Omega$ for a state of charge greater than about 18% for all three batteries. Therefore, the batteries exhibit very low DC resistance down to low states of charge. Low DC resistances can reduce heat generation in a battery pack, which can be desirable especially for vehicle applications.

Example 8

Performance of Coin Batteries with Graphitic Carbon Anodes

Coin cells were also formed with graphitic carbon anodes to test the cycling performance at longer numbers of cycles.

Coin cells were formed as described above except that the negative electrodes were formed as follows. The negative electrode comprised graphite as the active material.

To form the negative electrode, Super P™ acetylene black was mixed with NMP, and PVDF binder (KF9305™ from Kureha Corp., Japan) was added to the NMP and stirred. Graphitic material was added to the solution and stirred. The negative electrode composition was coated onto a copper foil current collector and dried. The negative electrode was then pressed to a desired thickness.

Figure 28:
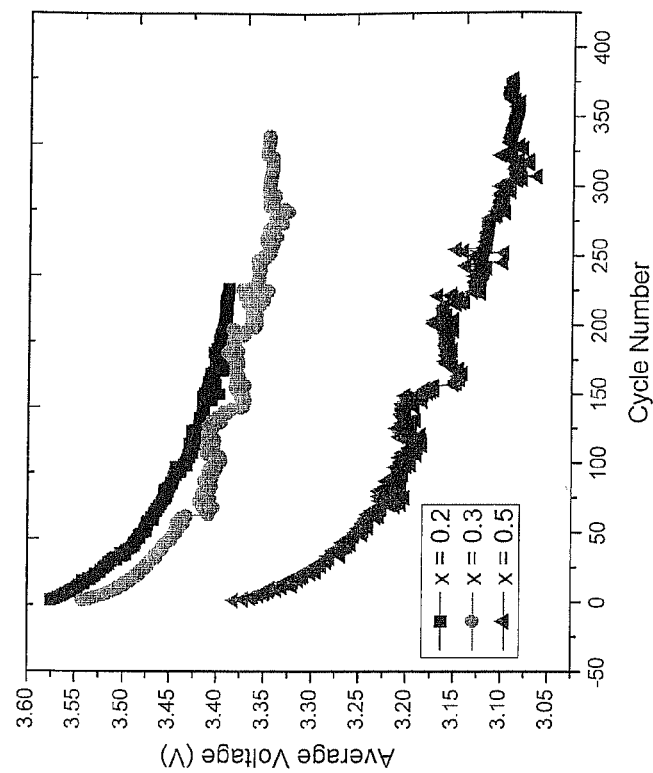
FIG. 28 is a graph with three plots of average voltage as a function of cycle number for coin cell batteries formed with graphitic carbon as the negative electrode active material and a lithium rich positive electrode active material with X=0.2, 0.3 and 0.5.
Figure 27:
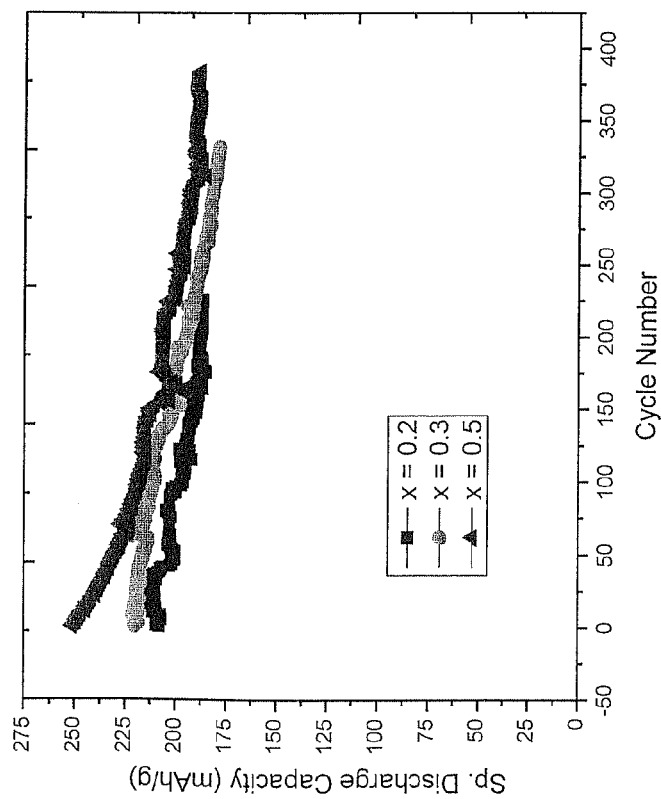
FIG. 27 is a graph with three plots of specific discharge capacity as a function of cycle number for coin cell batteries formed with graphitic carbon as the negative electrode active material and a lithium rich positive electrode active material with X=0.2, 0.3 and 0.5.

Coin batteries formed with cathode materials having $X=0.2$, $X=0.3$ and $X=0.5$ were cycled between 4.5V and 2 volts for 225, 350 and 400 cycles, respectively. The first two cycles were performed at a rate of C/10, and subsequent cycles were performed at a rate of C/3. The specific discharge capacities are plotted in FIG. 27. While the batteries with the $X=0.5$ compositions has significantly greater specific capacity initially, these batteries also exhibited faster fade of capacity with cycling. At 225 cycles, the cycling efficiencies with respect to specific capacity for the batteries relative to the initial cycling performance were about 90% for $X=0.2$, 87% for $X=0.3$ and 81% for $X=0.5$. Similarly, the average voltages were measured for these batteries with cycling. The average voltage as a function cycle number is plotted in FIG. 28 for the three coin batteries. The batteries formed with the $X=0.5$ cathode composition exhibited a significantly lower average voltage at all cycles relative to the other two batteries, and the average voltage dropped more quickly with cycling for the battery with the $X=0.5$ cathode material. A lower average voltage generally results in a corresponding decrease in energy and power available from the battery. The battery with the $X=0.2$ composition exhibited just a slightly greater average voltage at all of the cycles relative to the average voltage exhibited by the battery with $X=0.3$.

The embodiments above are intended to be illustrative and not limiting. Additional embodiments are within the claims.

In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. As used herein, the notation (value1≤variable≤value2) implicitly assumes that value 1 and value 2 are approximate quantities.

What is claimed is:

1. A positive electrode active composition for a lithium ion battery having a specific discharge capacity of at least about 230 mAh/g cycled from 4.6 volts to 2.0 volts at a rate of C/3 and comprising a layered lithium metal oxide approximately represented by the formula x $Li_2MnO_3 \cdot (1-x)$ Li $Ni_{u+\Delta}Mn_{u-\Delta}Co_wA_yO_2$, x is at least about 0.35 and no more than about 0.425, the absolute value of $\Delta$ is no more than about 0.3, $2u+w+y$ is approximately equal to 1, w is in the range from 0 to 1, u is in the range from 0.2 to 0.5 and y is no more than about 0.1, with the proviso that both $(u+\Delta)$ and w are not zero, wherein an optional fluorine dopant can replace no more than about 10 mole percent of the oxygen.

2. The positive electrode active composition of claim 1 the absolute value of $\Delta$ is no more than about 0.2, w is at least about 0.1 and no more than about 0.6, u is at least about 0.225 and no more than about 0.45.

3. The positive electrode active composition of claim 1 the absolute value of $\Delta$ is no more than about 0.15, w is at least about 0.2 and no more than about 0.475, u is at least about 0.25 and no more than about 0.4 and y is approximately 0.

4. The positive electrode active composition of claim 1 wherein the positive electrode active material is approximately represented by the formula $Li_{1+b}Ni_\alpha Co_\gamma Mn_\beta O_2$, where b ranges from about 0.149 to about 0.173, $\alpha$ ranges from 0 to about 0.4, $\gamma$ ranges from 0 to about 0.46, $\beta$ range from about $2b+\alpha-0.2$ to about $2b+\alpha+0.2$ with the proviso that both $\alpha$ and $\gamma$ are not zero, where $b+\alpha+\beta+\gamma$ is approximately equal to 1.

5. The positive electrode active composition of claim 1 further comprising a coating having a different composition from the active composition.

6. The positive electrode active composition of claim 1 further comprising a coating comprising a metal oxide.

7. The positive electrode active composition of claim 1 having a specific discharge capacity of at least about 190 mAh/g cycled from 4.6 volts to 2.0 volts at a rate of 1C.

8. The positive electrode active composition of claim 1 having an average voltage of at least about 3.64 cycled between 4.6 volts and 2.0 volts.

9. The positive electrode active composition of claim 1 having a first cycle irreversible capacity loss upon charging to 4.6V of no more than about 65 mAh/g.

10. A battery comprising a negative electrode, a positive electrode comprising the positive electrode active composition of claim 1, a separator between the positive electrode and the negative electrode, and an electrolyte comprising lithium ions.

11. The battery of claim 10 wherein the negative electrode comprises graphitic carbon.

12. A method for synthesizing a positive electrode active composition, the method comprising:
co-precipitating a precursor composition comprising manganese as well as nickel and/or cobalt in selected amounts corresponding to a product composition approximately represented by the formula x $Li_2MnO_3 \cdot (1-x)$ Li $Ni_{u+\Delta}Mn_{u-\Delta}Co_wA_yO_2$, x is at least about 0.35 and no more than about 0.425, the absolute value of $\Delta$ generally is no more than about 0.3, $2u+w+y$ is approximately equal to 1, w is in the range from 0 to 1, u is in the range from 0.2 to 0.5 and y is no more than about 0.1 with the proviso that both $(u+\Delta)$ and w are not zero, wherein an optional fluorine dopant can replace no more than about 10 mole percent of the oxygen;
adding a lithium source at a selected point in the process;
heating the precursor composition to a first temperature to decompose the precursor composition to form a metal oxide; and
heating the metal oxide to a second temperature greater than the first temperature to improve the crystallinity of the metal oxide wherein the product active composition has a specific discharge capacity of at least about 230 mAh/g cycled from 4.6volts to 2.0 volts at a rate of C/3.

13. The method of claim 12 wherein the precursor composition comprises an hydroxide.

14. The method of claim 12 wherein the precursor composition comprises a carbonate.

15. The method of claim 12 wherein the lithium source is blended with the precursor composition prior to the decomposition of the precursor composition to form the metal oxide.

16. A positive electrode active material for a lithium ion cell comprising a layered lithium metal oxide approximately represented by the formula $Li_{1+b}Ni_\alpha Mn_\beta Co_\gamma A_\delta O_{2-z}F_z$ where b ranges from about 0.149 to about 0.173, $\alpha$ ranges from 0.1 to about 0.4, $\beta$ range from about 0.2 to about 0.65, $\gamma$ ranges from 0 to about 0.46, $\delta$ ranges from about 0 to about 0.15 and z ranges from 0 to 0.2, and where A is Mg, Sr, Ba, Cd, Zn, Al, Ga, B, Zr, Ti, Ca, Ce, Y, Nb, Cr, Fe, V, Li or combinations thereof, and having a discharge capacity at the 10th cycle that is at least about 170 mAh/g when discharged at room temperature at a discharge rate of 2C.

17. The positive electrode active material of claim 16 having a discharge capacity at the 10th cycle that is at least about 180 mAh/g when discharged at room temperature at a discharge rate of 2C.

18. The positive electrode active composition of claim 16 further comprising a coating having a different composition from the active composition.

19. The positive electrode active composition of claim 16 having a specific discharge capacity of at least about 235 mAh/g cycled from 4.6volts to 2.0 volts at a rate of C/3.

20. The positive electrode active composition of claim 16 having a specific discharge capacity of at least about 190 mAh/g cycled from 4.6volts to 2.0 volts at a rate of 1C.

21. The positive electrode active composition of claim 16 having an average voltage of at least about 3.64 cycled between 4.6 volts and 2.0 volts.

22. The positive electrode active composition of claim 16 having a first cycle irreversible capacity loss upon charging to 4.6V of no more than about 65 mAh/g.

23. The positive electrode active composition of claim 16 wherein $\alpha$ ranges from 0.1125 to about 0.35 and $\delta$ ranges from 0 to about 0.35.

24. The positive electrode active composition of claim 16 further comprising a coating comprising a metal oxide.

* * * * *